(12) United States Patent
Ohtsuka et al.

(10) Patent No.: US 6,173,504 B1
(45) Date of Patent: Jan. 16, 2001

(54) MEASURING INSTRUMENT, PROBE FOR THE SAME, AND MEASURING METHOD

(75) Inventors: Yukiharu Ohtsuka; Yoshio Saruki; Yoshio Moriya, all of Kawasaki (JP)

(73) Assignee: Mitutoyo Corporation (JP)

( * ) Notice: Under 35 U.S.C. 154(b), the term of this patent shall be extended for 0 days.

(21) Appl. No.: 09/477,946

(22) Filed: Jan. 5, 2000

Related U.S. Application Data

(62) Division of application No. 09/073,676, filed on May 6, 1998.

(30) Foreign Application Priority Data

May 7, 1997 (JP) .................................................... 9-116941
May 7, 1997 (JP) .................................................... 9-116945

(51) Int. Cl.[7] .............................. G01B 5/03; G01B 5/14
(52) U.S. Cl. ............................................................. 33/559
(58) Field of Search .............................. 33/559, 560, 542, 33/783

(56) References Cited

U.S. PATENT DOCUMENTS

| 4,562,648 | 1/1986 | Danielli | 33/504 |
|---|---|---|---|
| 5,228,205 | * 7/1993 | Bertz et al. | 33/560 |
| 5,394,757 | * 3/1995 | Workman et al. | 33/560 |
| 5,454,175 | * 10/1995 | Li | 33/542 |
| 5,465,498 | * 11/1995 | Lycan | 33/542 |
| 5,517,124 | * 5/1996 | Roades et al. | 33/559 |
| 5,625,957 | * 5/1997 | Breyer et al. | 33/559 |

FOREIGN PATENT DOCUMENTS 2256409  12/1992  (GB).
4074903   3/1992  (JP).

* cited by examiner

Primary Examiner—G. Bradley Bennett
(74) Attorney, Agent, or Firm—Webb Ziesenheim Logsdon Orkin & Hanson, P.C.

(57) ABSTRACT

A body 1 placed thereon with a table 35 put thereon with an object to be measured W, and a portal frame 41 supporting both ends of rail 43 to the body through pillars 42A and 42B, the rail being placed above the table 35 and extending along a moving direction of a pair of probes 91A and 91B, are provided. A pair of sliders 51A and 51B are movably supported by the rail 43. The pair of the probes is extended downward from the sliders 51A and 51B to be abutted to the object W put on the table 35. The flexural deformation of the probes 91A and 91B is decreased due to the shorter length of the probes 91A and 91B, so that the high accurate measurement is achieved and a relative measurement is omitted.

6 Claims, 22 Drawing Sheets

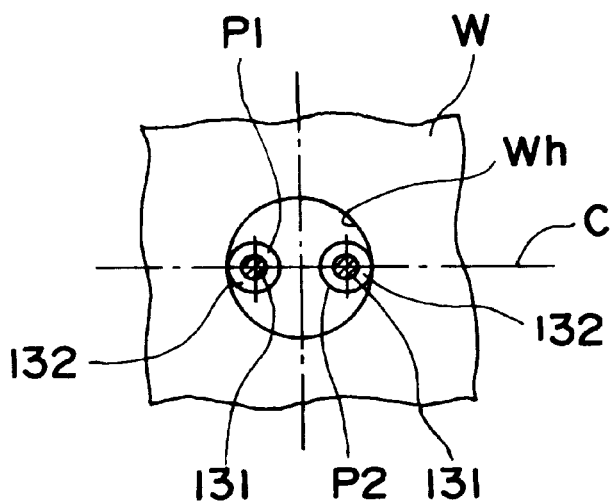
F I G. 27A
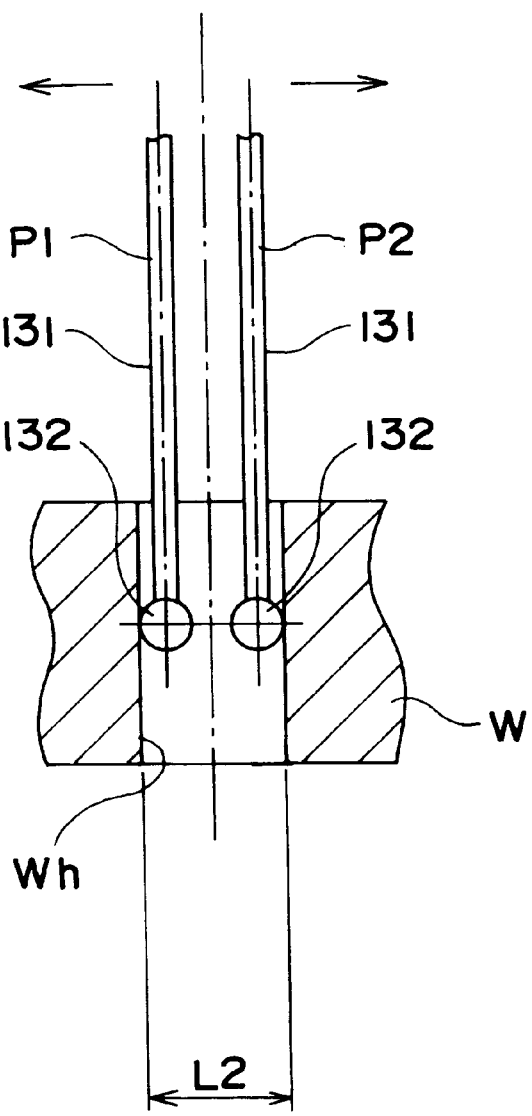
F I G. 27B

MEASURING INSTRUMENT, PROBE FOR THE SAME, AND MEASURING METHOD

CROSS REFERENCE TO RELATED APPLICATION

This application is a divisional of U.S. patent application Ser. No. 09/073,676, filed May 6, 1998 and claims the priority benefits thereof.

BACKGROUND OF THE INVENTION

1. Field of the Invention

This invention relates to a measuring instrument and a measuring method, in which inner and outer dimension or a diameter of an object is measured by the distance between a pair of probes when the pair of the probes is abutted to the object to be measured while moving relatively; and to a probe for a measuring instrument that is most suitable for the inner dimension measurement.

2. Description of the Related Art

An inner and outer dimension measuring instrument, in which inner and outer dimension of an object is measured by the distance between a pair of probes when the probes are abutted to a surface of the object while moving relatively, is used.

According to the inner and outer dimension measuring instrument, the inner and outer dimension of the object is measured by the distance between the pair of the probes, so that it is possible to measure various sizes of objects, such as the diameters of a ring-shaped object, a diameter of a hole or the width of a groove which is formed on an object, and a thickness of an object.

Conventionally, for example, an inner and outer dimension measuring instrument 110, shown in FIG. 20, is known as an inner and outer dimension measuring instrument.

The inner and outer dimension measuring instrument 110 is composed of: a body 111; a table 112 mounted on the body 111 so that an object to be measured W is put thereon; and a pair of probes P1 and P2 extending upward from the surface of the table 112 on which the object W is put, and the probes respectively moved in respectively opposite directions A and B to abut to and separate from surfaces of the object W.

The body 111 is provided therein with a rail 115 extending along a moving direction of the probes P1, P2, and the pair of sliders 55 movably supported with respect to the rail 115 and respectively supporting the bottom ends of a pair of probes P1 and. P2. The table 112 is provided on the upper face of the body 111 and has an X-Y table 113 to adjust the horizontal position of the object W, and a tilt adjusting table 114 to adjust a tilt of the object W against the probes P1 and P2.

For example, in the measurement of the inner dimension of the object W, after the probes P1 and P2 approach each other, the object W is put on the table 112. After that, the probes P1 and P2 are respectively moved in the directions A opposite to each other. While the probes P1 and P2 are abutted to the inner side of the object W, each position of the sliders 116 is read from a displacement detector (not shown), thus measuring the inner diameter of the object W as the distance between the pair of the probes P1 and P2. Note that, in the measurement, force acting in a direction toward the object W is applied to the probes P1 and P2 through the sliders 116, so that the contacting force is maintained between the object W and the probes P1 and P2. As a result, the probes P1 and P2 can be surely abutted to the inner circumferential face of the object W.

Another inner and outer dimension measuring instrument 120, shown in FIG. 21, is known.

The inner and outer dimension measuring instrument 120 is composed of: a body 121, a table 122 mounted on the body 121, a pair of rails 125 provided on the body 121 on both sides of the table 122, a slider 126 provided on each of a pair of the rails 125, an arm 127 attached to each slider 126, and a pair of probes P1 and P2 respectively provided to the ends of the arms 127. Similarly to the aforementioned table 112, the table 122 has an X-Y table 123 and a tilt adjusting table 124.

Similarly to the aforementioned inner and outer dimension measuring instrument 110, for example, in the measurement of the inner dimension of the object W, after the probes P1 and P2 are moved in the directions A to separate from each other, each position of the sliders 126 is read from a displacement detector (not shown) when the probes P1 and P2 are abutted to the inner side-face of the object W, thus measuring the inner diameter of the object W as a distance between the probes P1 and P2.

The following disadvantages, however, can be listed when the objects W having various sizes are measured with high accuracy by the aforementioned inner and outer dimension measuring instruments 110 or 120.

Disadvantage 1

In the inner and outer dimension measuring instrument 110, the table 112 has a multilayer structure composed of the X-Y table 113 and the tilt adjusting table 114, so that each of the probes P1 and P2 should have a sufficient length to project above the table 112 from the slider 116 located under the table 112. In consequence, when the probes P1 and P2 are abutted to the inner side-face of the object W at the predetermined contacting force, a difference may be occurred between the actual distance between the probes P1 and P2 and a measured value indicated on the displacement detector.

On the inner and outer dimension measuring instrument 120, although the length of the probes P1 and P2 is shorter, the length of the arm 127 needs to be longer in order to measure any object W having various sizes. According to the extent of the length of the arm 127, the arm 127 is flexed by the dead weight thereof and the contacting force of the probes P1 and P2 to the object W, thereby also producing a difference between the actual distance between the pair of the probes P1 and P2 and a measured value indicated on the displacement detector.

To resolve the aforementioned measuring errors, in the inner and outer dimension measuring instruments 110 and 120, the measurement of the object W is carried out with a relative measurement in which a measured value is corrected with pre-measured standard sample.

For the reason that the flexure of the probes P1 and P2 or the arm 127 exerts an influence upon the measurement in these conventional inner and outer dimension measuring instruments 110 and 120, the relative measurement is always needed irrespective of the required accuracy of the measurement of the object W, resulting in complicated processes for measuring the object W.

In the measurement using the longer probes P1 and P2 and the longer arm 127, the absolute amount of the flexure is larger, so that the dispersion in the contacting force of the probes P1 and P2 exerts an influence upon the dispersion in the measured values, resulting in difficulties in the measurement with high accuracy.

Disadvantage 2

To properly measure the inner or the outer diameter of the object W by any one of the aforementioned inner and outer dimension measuring instruments 110 and 120, after the object W is put on the inner and outer dimension measuring instrument, it is needed to perform two adjustments, that is, adjustment for aligning a measurement axis (an axis line on which the probe is moved) of the measuring instrument with a diametral position of the object W (a measuring position adjustment), and adjustment for correcting a tilt of the axis of the inner or outer diameter of the object W relative to an axis line perpendicular to the measurement axis (a tilt adjustment). In other words, the axis of the inner or outer diameter of the object W should be adjusted to intersect at right angles to the measurement axis.

For example, in the measurement of the inner diameter, as shown in FIG. 22, when the diametral position of the object W differs from the measurement axis of the measuring instrument, a space d between the pair of the probes P1 and P2 is smaller than a diameter D of the object W, so that the accurate measurement is impossible. As shown in FIG. 23, in order to properly measure the inner diameter (or the outer diameter) of the object W, the diametral position of the object W is needed to be aligned with the measurement axis of the measuring instrument.

As shown in FIG. 24, when the axis of the inner diameter (or the outer diameter) of the object W has a tilt with respect to the axis line perpendicular to the measurement axis, the space d between the pair of the probes P1 and P2 is larger than the diameter D of the object W, so that the accurate measurement is also impossible. As shown in FIG. 25, the tilt of the axis of the inner diameter (or the outer diameter) of the object W with respect to the axis line perpendicular to the measurement axis should be corrected in order to properly measure the inner (or outer) diameter of the object W.

It is laborious and takes much time to perform an adjusting process to align the measurement axis of the measuring instrument with the diametral position of the object W and an adjusting process to correct a tilt of the axis of the inner or outer diameter of the object W with respect to an axis line perpendicular to the measurement axis.

For example, in the measuring position adjustment, after the probes P1 and P2 are abutted to the inner circumferential face of the object W, while the pair of the probes P1 and P2 and the object W are relatively moved in a perpendicular direction (a diametrical direction) with respect to the measurement axis, the space between the pair of the probes P1 and P2 is measured to find positions where the the probes P1 and P2 are at the maximum distance from each other. By positioning the probes P1 and P2 and the object W at the found position, the diametral position of the object W and the measurement axis of the measuring instrument are aligned. In this case, the moving error element in a direction of the measurement axis has little effect, so that the straight moving precision of a relative movement mechanism is not required to be especially high.

On the other hand, where the tilt adjustment for correcting the tilt of the axis of the inner or outer diameter of the object W with respect to the axis line perpendicular to the measurement axis is concerned, even when the pair of the probes P1 and P2 and the object W are relatively moved in the axial direction perpendicular to the measurement axis (the axis direction of the inner or outer diameter), with the pair of the probes PI and P2 being abutted to the inner or outer circumferential face of the object W, the pair of the probes P1 and P2 moves in the same direction as the direction of the measurement axis, so that the detection of the tilt is impossible. In consequence, this adjustment needs great effort and a lot of time.

It should be mentioned that, in the measuring position adjustment in an inner-diameter measuring instrument for measuring an inner diameter with a single probe, after the probe is abutted to the inner circumferential face of an object, displacement of the probe is detected to find a position where the displacement of the probe is maximum (or minimum) while the probe and the object are being relatively moved in a perpendicular direction (a diametrical direction) with respect to a measurement axis. After that the probe and the object are positioned at the found position. In this case, the movement straightness when the probe and the object are relatively moved in the perpendicular direction with respect to the measurement axis exerts an influence upon a measured value. That is, when the moving error element in a direction of the measurement axis is in a relative movement mechanism, the moving error element is added to the measured value, so that the straight moving precision of a relative movement mechanism is required to be high.

Disadvantage 3

As shown in FIG. 26, each of the probes P1 and P2 of both inner and outer dimension measuring instruments 110 and 120 described above is composed of a cylindrical stick-shaped steel shaft 131 connected to a slider at the base end thereof, and a ball-shaped steel contact portion brazing-welded on the distal end of the shaft 131, the outer circumferential face of the contact portion 132 being projected from the circumferential face of the shaft 131 in a diametrical direction so as to be abutted to the object W.

When the probes P1 and P2 are moved in directions opposite to each other and each contact portion 132 of the probes P1 and P2 is abutted to the face of the object W, the dimension measurement is performed in a state that the contacting force is applied to the probes P1 and P2 so that the contact portion 132 is in reliable contact with the face of the object W. Therefore, flexural deformation is produced on the shaft 131 by repulsion F from the face to be measured of the object W, whereby a difference between an actual value of the diameter and an indicated value on the displacement detector is produced.

For this reason, it is understood that the accurate measurement for L1 is reduced due to the larger amount of flexure when the rigidity of the shaft 131 is insufficient. In consequence, in order to ensure accuracy of the measurement, the diameter of the shaft 131 should be increased so as to increase the rigidity thereof and minimize the flexure thereof.

However, as shown in FIGS. 27A and 27B, in measuring inner diameter L2 of a small hole Wh formed on the object W, two probes P1 and P2 are simultaneously inserted into the small hole Wh. In this case, the diameter of each shaft 131 of the probes P1 and P2 should not be increased so much.

As shown in FIGS. 28A and 28B, a shaft 141 of an approximately semi-circular cross-section is formed by dividing a circular cross-section of a shaft, which is smaller than a diameter of the small hole Wh, at an axis line D perpendicular to the moving axis C. A hemispherical contact portion 142 is provided on the end of the shaft 141. Thus, the sections of shaft 141 of probes P1 and P2 can be increased.

However, even in the aforementioned probes P1 and P2, an area along the moving axis C in which repulsion F acts is still unenlarged, so that the rigidity relative to a force in a direction of the moving axis is not obtained sufficiently, resulting in the difficulties of the high accurate measurement for the inner dimensions L1 and L2 by the inner and outer dimension measuring instruments 110 and 120.

Moreover, in the probes P1 and P2, the shaft 141 has residual distortion depending on the size of repulsion F and a measured dimension can vary, therefore it is difficult to obtain reliable results of the measurement.

OBJECTS OF THE INVENTION

It is an object of the present invention to provide a measuring instrument capable of accurately measuring a dimension of an object and omitting a relative measurement, in which inner and outer dimensions of the object are measured by the distance between a pair of probes when the pair of the probes is abutted to a surface of the object to be measured during a relative movement.

It is still another object of the present invention to provide a probe for a measuring instrument which is capable of carrying out the accurate measurement irrespective of the distance between inner faces of an object to be measured, and the reliable inner dimension measurement.

SUMMARY OF THE INVENTION

Measuring instrument used for measuring inner and outer dimension

A measuring instrument according to the present invention, for measuring an inner and outer dimension of an object is measured by the distance between a pair of probes, the pair of the probes being abutted to a surface of the object while relatively moving, is characterized by including: a body, a table provided on the body for the object to be put on, and a portal frame supporting ends of a rail to the body through a pillar, the rail being placed above the table, extending along a moving direction of the pair of the probes, and provided with a pair of sliders at least one of which is movably supported thereon, and the pair of the probes is respectively provided to the pair of the sliders and extended downward from the sliders to be abutted to the side of the object.

According to the measuring instrument as described above, the pair of the probes to be abutted to the side of the object is extended downward from the pair of the sliders which is provided above the probes, and not passed through the table. In consequence, the flexural deformation of the probe can be decreased due to the minimum length of the probe which is defined in correspondence to a depth in a thick direction of the object, so that the highly accurate measurement is achieved, and a relative measurement requiring a standard sample should be further prepared is not needed.

In the portal frame, both ends of the rail supporting the pair of the sliders are supported by the pillars, so that the arm for extending as used in the conventional inner and outer dimension measuring instrument 120 shown in FIG. 21 is not needed, resulting in the simplified structure. Additionally, since the measurement error caused by the flexure of the arm is resolved, the accuracy of measurement of the inner and outer dimension of the object is enhanced.

In the aforementioned structure, it is advisable that the pair of the sliders is movably supported by the rail, and the pair of the probes is relatively moved in an opposite direction from each other.

Generally, in the measurement by the inner and outer dimension measuring instrument, the table put thereon with the object can be rotated in 90 degrees in order to measure the dimension in two directions perpendicular to each other. If one of the sliders and one of the probes are fixed, a centering position of the object is changed by the length of the object to be measured, so that a moving table for the centering position as well as the X-Y table and the tilt adjusting table described earlier are needed, resulting in the complicated table-structure.

In the inner and outer dimension measuring instrument in which the pair of the probes is relatively moved in the opposite direction from each other, however, original positions of the pair of the probes can be defined on the rotating axis of the object, so that the centering position of the object is obtained by fine adjustment of the X-Y table, resulting in the simplification of the table structure.

It is desirable that the table put thereon with the object as described above is provided with an elevating mechanism by which the table is moved downward to separate the object from the pair of the probes.

As the elevating mechanism, a structure having an elevating base provided in the body to lift up and down through a guide post and supporting the bottom face of the table, and a drive means for lifting up and down the elevating base can be considered.

In the aforementioned measuring instrument, since the distance between the object and the slider provided with the probe is short, it is possible that the object is knocked against the probe and broken when replacing of the object. However, by the elevating mechanism, the object and the probes are separated so that the side face of the object is not knocked against the probe when the objects are exchanged, thus the objects can be exchanged safely. Additionally, the operation of the measurement of the inner and outer dimension of the object is easier.

It is advisable that the rail constituting the portal frame is formed by one rail on which a first guiding face for guiding one of the pair of the sliders and a second guiding face for guiding the other slider are formed to divide the entire rail.

As the specific structure, it may be constructed as: the rail has a pillar shape of a quadrangular cross-section, in which the first guiding face and the second guiding face are formed to divide the rail at a symmetrical axis in the vertical direction of a quadrangular cross-section of the pillar shape; each of the first guiding face and the second guiding face has a top face portion, a side face portion and a bottom face portion; and each of the pair of the sliders has a vertical portion confronting each side portion of the first guiding face and the second guiding face, and a pair of horizontal portions perpendicularly extending from both ends of the vertical portion and confronting the top face portion and the bottom face portion.

According to the above structure, each of the first guiding face and the second guiding face is dividingly formed on the entire rail, so that a moving range of the sliders is defined on the whole rail, thereby achieving the reduction in size of the measuring instrument.

The pair of the sliders is movably attached on a single rail, so that it is not needed that the plural rails are precisely arranged in the moving direction of the probe, thereby simplifying the structure of the measuring instrument.

In the above structure, it is advisable that an air bearing is placed between the rail and the slider in order to decrease movement resistance, and additionally, when the slider has a sectional C-shape, each vertical portion of the sliders is provided with an attracting means for producing an attractive force balancing with repulsion caused by the air bearing.

In this point, the attracting means is a means for neutralizing the repulsion between the rail and the slider which is produced by air jetted from the air bearing. For example, the means may be a negative-pressure applying device vacuuming air between the rail and slider. Alternatively, a magnet may be placed on the slider so as to produce the attractive force between the slider and the rail, whereby the repulsion caused by the air bearing is neutralized.

That is to say, in the above measuring instrument, the movement resistance between the rail and the slider exerts an influence upon an amount and dispersion in flexure of the probe, so that the decrease of the movement resistance is an extremely important point for the accurate measurement. The air bearing is used between the rail and the slider, whereby the movement resistance is reduced to nearly zero. In consequence, the measuring instrument capable of performing the extremely precise measurement is achieved. Additionally, the attracting means for producing the attractive force to neutralize the repulsion caused by the air bearing is provided on the slider, so that a groove, extending along the longitudinal direction of the rail, or the like is not needed to be formed in order to prevent the slider from falling or the like, therefore the structure of the measuring instrument is further simple.

It is preferable that the air bearing is placed to be positionally adjusted in an out-of-plane direction of the horizontal portion and the vertical portion.

When the air bearing is provided to be position-adjustable, the air bearing can be placed at a position appropriate for the decrease of the movement resistance with respect to the rail regardless of dimensional precision of the slider and the rail. The undue precision is not needed for the dimensional precision of the slider and the rail, so that the production costs for the moving mechanism of the probe are reduced.

Measuring instrument for the inner and outer diameter measurement

A measuring instrument according to the present invention, in which inner and outer diameter of an object is measured by the distance between a pair of probes, when a pair of probes is abutted to an inner or outer circumferential face of the object to be measured at a predetermined pressure during movement along a measurement axis, is characterized by including: a body having a table put thereon with the object; a first relative moving means for relatively moving the pair of the probes and the table in a first relative moving direction that is perpendicular to the measurement axis and almost parallel to a diameter direction of the object to be measured; a second relative moving means for relatively moving the pair of the probes and the table in a second relative moving direction that is perpendicular to the measurement axis and perpendicular to the first relative moving direction; a tilt adjusting means for adjusting a tilt of the table with respect to a plane perpendicular to the second relative moving direction; and a probe drive controlling means for moving the pair of the probes along the measurement axis and moving any one of the probes along the measurement axis.

In the above structure, more preferably, the measuring instrument has a rotating means for rotating the table about an axis parallel to the second relative moving direction.

According to the above measuring instrument, the probe drive controlling means causes the pair of the probes to be abutted to the inner or outer circumferential face of the object and to be urged in the abutting direction at a predetermined pressure, while the first relative moving means relatively moves the pair of the probes and the object in the first relative moving direction perpendicular to the measurement axis and approximately parallel to the diameter direction of the object. The measuring means measures the distance between the pair of the probes. The pair of the probes and the object are placed at a position where the space between the pair of the probes is maximum. Thereby the diametral position of the object and the measurement axis are aligned.

Successively, at the position where the space between the pair of the probes is maximum, one of the probes is abutted to the inner or outer circumferential face of the object. In this state, while the second relative moving means relatively moves the other probe and the object in a second relative moving direction perpendicular to the movement axis and perpendicular to the first relative moving direction, the measuring means measures a change in space between the pair of the probes. The tilt adjusting means adjusts the tilt of the table so that the change in space between the pair of the probes is minimum. Thereby the tilt of the axis of the inner or outer diameter of the object can be adjusted. That is, the axis of the inner or outer diameter of the object is aligned with the axis line perpendicular to the measurement axis.

After the adjustment of the tilt of the axis of the inner or outer diameter of the object, the pair of the probes is abutted to the inner or outer circumferential face of the object while being relatively moved along the measurement axis. At this time, the space between the pair of the probes is measured, thus measuring of the inner or outer diameter of the object.

In the above structure, as a moving mechanism of the probe in the measurement axis direction, the measuring instrument may further include a portal frame supporting ends of a rail to the body with a pillar, the rail being placed above the table and extending along the moving direction of the pair of the probes, and the pair of sliders provided to move along the rail of the portal frame, in which the pair of the probes is supported by the pair of the sliders to extend downward from the sliders.

The second relative moving means may include an elevating base provided in the body to be lifted up and down through a guide post and supporting the bottom face of the table, and an elevating mechanism including a drive means for lifting up and down the elevating base.

It is advisable that a sliding face is formed on the top face of the elevating base for connecting the bottom face of the table to receive the table and a load on the table, and for movably supporting the table.

According to the above structure, the weight of the table and load on the table such as the weight of a workpiece or the object put on the table, receive on the sliding face of the elevating base, in other words, do not act on the moving mechanism for moving the table in each direction, so that the deformation of the moving mechanism is avoided and the precision can be ensured. Additionally, a complicated structure for avoiding the deformation of the moving mechanism is not needed, so that the reduction in size and costs can be attained.

In this point, the sliding face may be formed on a circumference of which center is an axis line parallel to the second relative moving direction; and the rotating means and the first relative moving means may be accommodated in a recess portion formed inside the sliding face formed on the circumference and under the table.

In the above structure, even when the object to be measured or the workpiece is put off-center on the table or when the table is moved, the table is movably supported on the elevating base with a stable attitude. Since the rotating means and the first relative moving means can be accommodated in the recess portion formed under the table, resulting in the compact measuring instrument.

A lower frictional member may be formed on the sliding face.

For this reason, the friction resistance between the top face of the elevating base and the bottom face of the table can be decreased, whereby the table is further smoothly moved.

Probe for the measuring instrument

A probe according to the present invention is a probe for a measuring instrument, in which an inner dimension of an object is measured by the distance between the pair of the probes, when the pair of probes is abutted to an inner or outer circumferential face of the object by being moved in an opposite direction from each other, and is characterized by including: a stick-shaped shaft connected to a moving member, moving the probe, at the end base thereof; and a contact portion provided at the other end of the shaft and abutted to a face of the object to be measured, in which a cross-section of the shaft has a longer length, extending along a moving direction of the probe, than a width thereof extending in a direction perpendicular to the moving direction, and the shafts of the pair of the probes are placed on both sides of a moving axis and overlap when the probes approach each other.

In this point, the measurement of the inner dimension of the object might be to measure a diameter of a circular hole or between inner opposite side of a quadrangular hole formed on the object or to measure a width of a groove formed on the object. In other words, the measurement is to measure an area in which the separating movement of the pair of the probes is limited by the inner side faces of the object.

Note that rigidity k of the shaft of the probe is evaluated by the following expression. The rigidity k of the shaft is decided by geometrical moment of inertia I, where length S of the probe along the axis and Young's modulus E as the material characteristics are the same.

$$k = 3EI/S^3$$

E: Young's modulus
I: geometrical moment of inertia of the shaft
S: length of the probe along the axis According to the probe as describe above, when the pair of the probes is moved toward each other, the shafts are located on both sides of the moving axis, so that the total cross-sectional area of the shafts of the pair of the probes can be made small. Even in the inner dimension measurement of the object having a small area such as a diameter of a small hole, the pair of the probes can be easily inserted.

The length of the cross-section of the shaft in the repulsion-acting direction is longer than the length of the conventional probes P1 and P2, so that geometrical moment of inertia with respect to the direction of the shaft is larger, therefore the rigidity of the shaft is improved. In consequence, the flexural deformation of the shaft caused by the repulsion can be decreased, and the measurement of the inner dimension of the object is carried out with high accuracy.

The rigidity of the shaft is ensured, so that the possibility of the residual distortion or the like occurring in the probe is decreased even when the aforementioned repulsion F in measurement is removed. As a result, the inner dimension measurement of the object is carried out with high reliability.

In the above structure, it is preferable that the cross-section of the shaft has an approximately semi-circular shape, and formed to be approximately circular when being combined with another cross-section of the shaft of the pair of the probes by the movement of the pair of the probes to approach each other.

Since the cross-section of the shafts when the pair of probes is combined has an approximately circular shape, the inner dimension measurement is carried out regardless of configuration of the small hole, such as a circular hole and a quadrangular hole.

As the probe as described above, the probe may include a linking portion having a cross-section of the shaft rotated in 90 degrees around the axis of said shaft, the cross section having larger longitudinal dimension along the moving direction of said contact type probes than the width dimension perpendicular to the moving direction of said probes, the shaft and the contact portion being connected through the linking portion.

In this case, it is advisable that the length of the linking portion is made shorter as possible, and the contact portion has an approximately hemispherical shape.

That is, with the contact portion having the hemispherical shape, the combined contact portions form an approximately ball shape when the pair of the probes is moved toward each other, so that the probes are further smoothly inserted into the small hole.

The aforementioned probe is fabricated by brazing-welding the end of the shaft to the contact portion. On the cross-section of the shaft, it is preferable that the length along the moving axis is longer than the height as described above. On the cross-section of the contact portion having the hemispherical shape, however, it is advisable that the length along the moving axis is shorter in consideration of the moving direction and the inserting process to small holes.

Therefore, when the shaft and the contact portion as described above are brazing-welded, an area for brazing-welding is smaller, so that enough strength of the contact type probe cannot be obtained.

Thus, if the aforementioned linking portion is formed around the end portion of the shaft, the brazing-welded area of the contact portion is larger since the linking portion has a semi-circular cross-section which the cross-section of the shaft is rotated in 90 degrees, thus the strength of the probe is ensured.

Measuring method

A measuring method for measuring an inner or outer diameter of an object to be measured by a distance between a pair of probes, the pair of probes being movable along a measurement axis and being relatively moved to be abutted to the inner or outer diameter of the object, is characterized by having the steps of:

adjusting the measuring position, in which the pair of the probes are abutted to the inner or the outer diameter of the object and urged at certain pressure, in which the distance between the pair of the probes is measured while the pair of the probes and the object are relatively moved in a first relative movement direction perpendicular to the measurement axis and approximately parallel to the diametral direction of the object, and in which the pair of the probes and the object are positioned so that the distance between the pair of the probes is maximized, adjusting the tilt of the inner or the outer diameter of the axis of the object, in which the change in the distance between the pair of the probes is measured at the position where the distance between the pair of the probes is maximized while only one of the pair of the probes is abutted to the inner or the outer diameter of the object, in which the one of the pair of the probes and the object is relatively moved in a second relative moving direction perpendicular to the measurement axis and perpendicular to the first relative moving direction, and in which the tilt of the inner or the outer diameter of the axis of the object is adjusted so that the change in the distance between the pair of the probes is minimized, and after the tilt is adjusted, measuring the inner or the outer diameter of the object by the distance between the pair of the probes being abutted to the inner or the outer diameter of the object after the relative movement of the pair of the probes along the direction of the measurement axis.

According to the above measuring method, with the selective use of the pair of the probes, the adjustment for aligning the measurement axis with the diametral position of the object, and the adjustment for correcting the tilt of the axis of the inner diameter of the object relative to the axis line perpendicular to the measurement axis are accurately and easily carried out.

More specifically, concerning the process of the adjustment for aligning the measurement axis with the diametral position of the object, since the pair of the probes is used, there is no disadvantage when a single probe is used, namely, no disadvantage in that the moving error element exerts an influence upon the measured values when a moving error element in a direction of the measurement axis is in the relative moving mechanism of the probe and the object (the mechanism relatively moving the probe and the object in a direction perpendicular to the measurement axis). Thus, the relative moving mechanism of the object and the prove is not needed to be precise, and additionally, the sensitivity of detection is twice as higher as that in the measurement with the use of a single probe. Concerning the processes of the adjustment for correcting the tilt of the axis of the inner or outer diameter of the object with respect to the axis line perpendicular to the measurement axis, since the sole probe is used, there is no disadvantage in adjustment with the use of two probes. In consequence, the adjustments are carried out smoothly and precisely.

In the above measuring method, it is advisable that the measuring method includes a step of rotating the object in 90 degrees about an axis parallel to the second relative moving direction.

For the measuring method as described thus far, through the measuring position adjustment process and the tilt adjustment process, the measuring position adjustment and the tilt adjustment are carried out with respect to a direction of the inner or outer diameter of the object (e.g., the X-axis direction). After that, the table is rotated in 90 degrees about an axis parallel to the second relative moving direction, and then the measuring position adjustment process and the tilt adjustment process are carried out. Thereby the measuring position adjustment and the tilt adjustment are carried out with respect to the Y-axis direction of the inner or outer diameter of the object, so that the measurement is carried out with respect to two directions of the inner or outer diameter of the object without reloading the object.

BRIEF DESCRIPTION OF THE DRAWINGS

FIGS. 27A and 27B are drawings showing a state that a conventional probe is inserted into a small hole formed on an object to be measured in an inner-diameter measurement.

DETAILED DESCRIPTION OF THE PREFERRED EMBODIMENT(S)

The preferred embodiments when an inner and outer dimension measuring instrument according to the present invention is applied to an inner diameter measuring instrument will be explained below with reference to the attached drawings.

Overview

Figure 1:
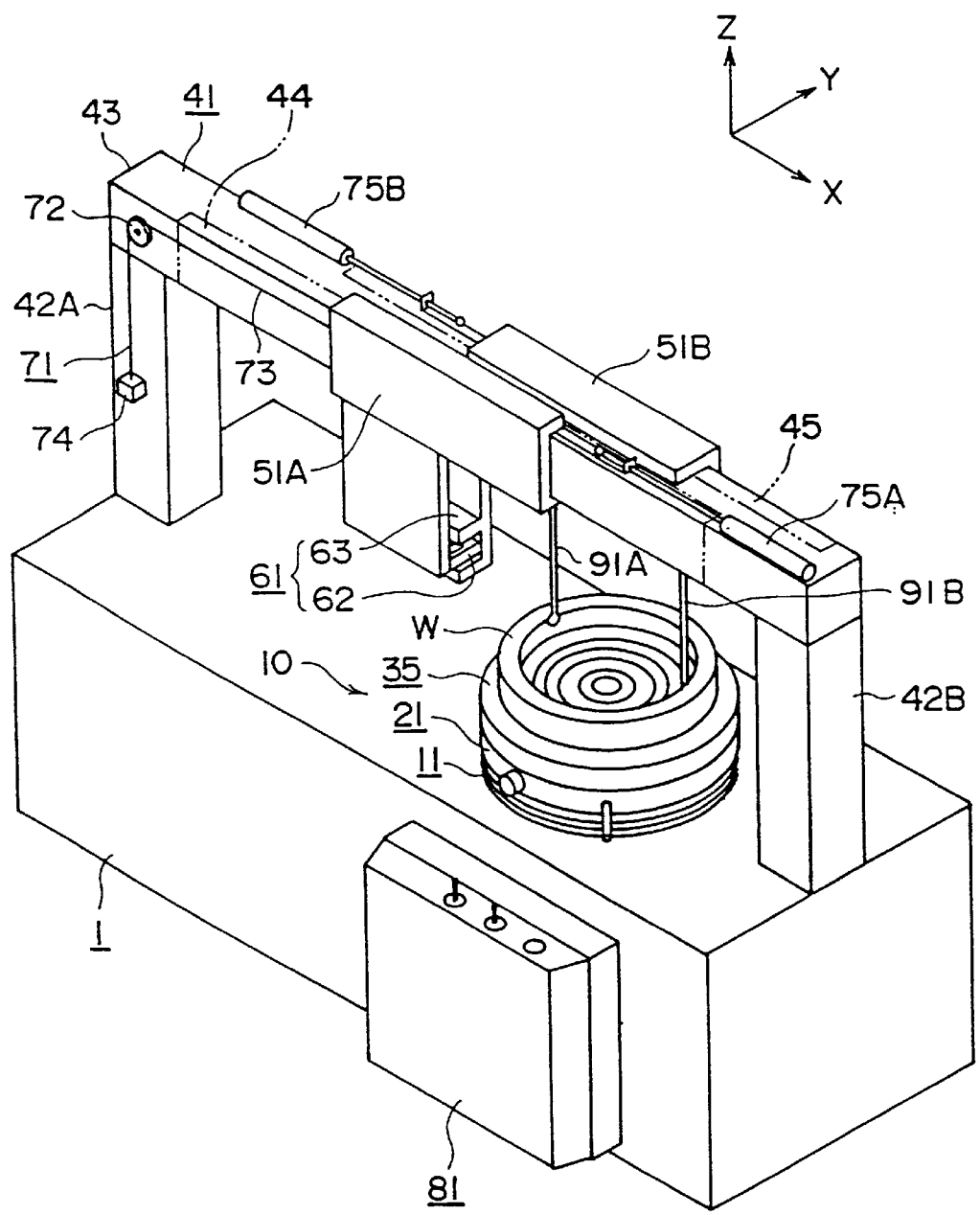
FIG. 1 is a perspective view of an inner and outer dimension measuring instrument of a preferred embodiment according to the present invention.

FIG. 1 is a perspective view of the inner diameter measuring instrument according to the embodiment. The inner diameter measuring instrument is provided with: a bed 1; a table device 10 placed on the bed 1 and attached thereon with an object to be measured W; a portal frame 41 mounted on both ends of the bed 1 to cross over the table device 10; a pair of sliders 51A and 51B movably provided along a rail 43 of the portal frame 41; a pair of probes 91A and 91B respectively attached to the sliders 51A and 51B and abutting to the inner circumferential of the object W; a measuring means 61 for measuring a space between the pair of the probes 91A and 91B; an urging means 71 for urging the sliders 51A and 51B at a predetermined pressure in directions of separating the pair of the probes 91A and 91B from each other (directions of abutting to the probes to the inner circumferential face of the object W. Incidentally, urging means 71 for urging the slider 51B is located behind the rail 43 and the pillar 42B and is not shown in the drawings); and a probe drive controlling means 81 for moving the sliders 51A and 51B along a direction of measurement axis simultaneously (in this point, the longitudinal direction of the rail 43), or moving any one of the sliders along the direction of the measurement axis.

Where the direction of the measurement axis is an X-axis direction, a Y-axis direction perpendicular to the X-axis direction and approximately parallel to the diametrical direction of the object W can be referred to as the first relative moving direction, Z-axis direction perpendicular to the X-axis and Y-axis directions can be referred to as the second relative moving direction, and a direction rotating about the Z-axis can be referred to as the third relative moving direction hereinafter.

Table device 10

Figure 2:
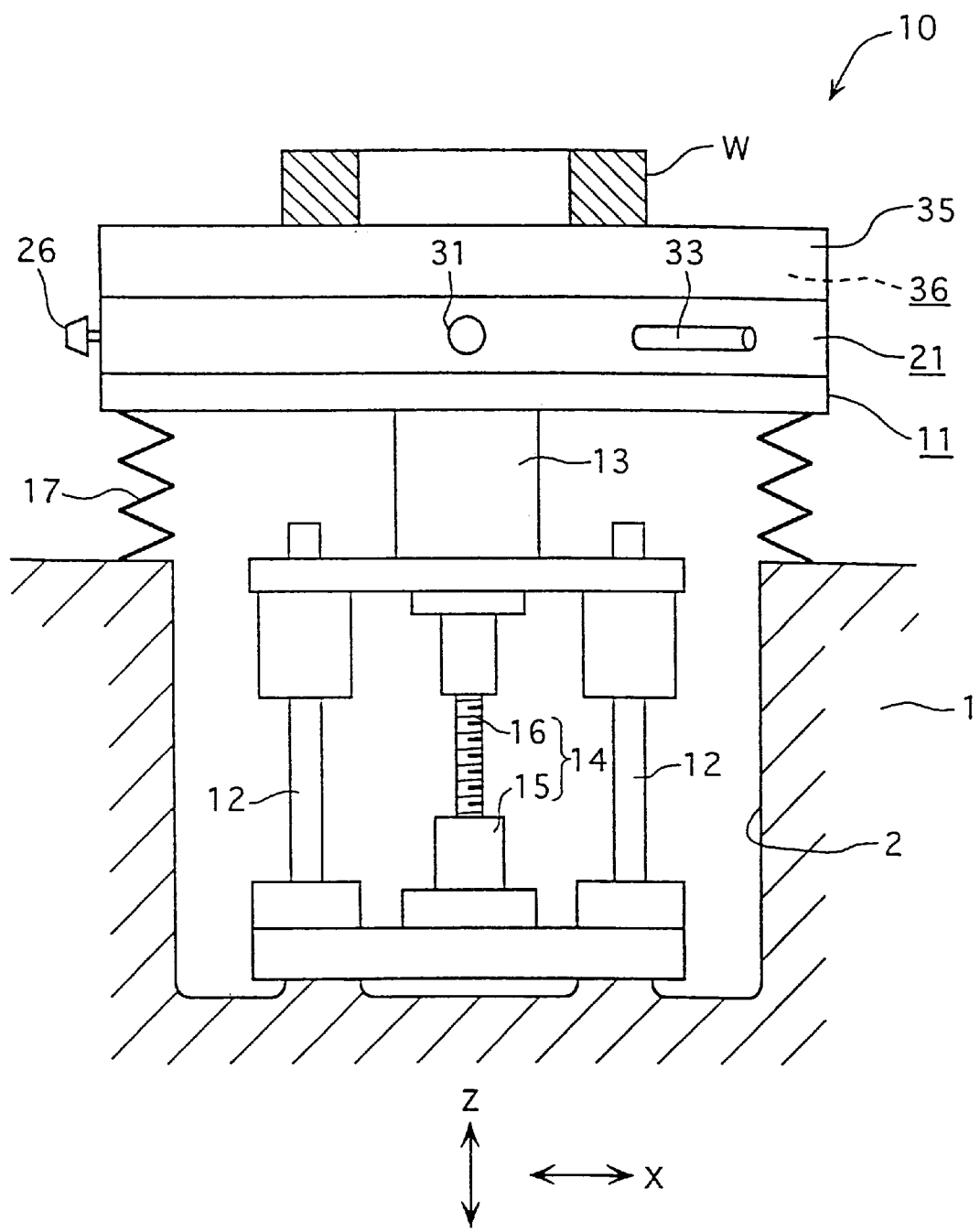
FIG. 2 is a front view of a table device of the preferred embodiment.

As shown in FIG. 2, the table device 10 has: an object-attaching table 35 attached thereon with the object W; an elevating mechanism 11, as the second relative moving means for lifting up and down the table 35 in the Z-axis direction (the vertical direction in FIG. 2); an X-Y moving and rotating mechanism 21 as the first relative moving means and the rotating means for moving the table 35 in the X-axis direction and the Y-axis direction which are perpendicular to the Z-axis direction and to each other, and rotating the table 35 about the Z-axis; and a tilt adjusting mechanism 36 as a tilt adjusting means for adjusting a tilt of the table 35 with respect to an X-Y plane.

The elevating mechanism 11, in turn, is composed of an elevating base 13 placed in a recess portion 2 of the bed 1 to move in the Z-axis direction through plural guide posts 12, and a drive means 14 lifting up and down the elevating base 13. The drive means 14 has a motor 15 and a screw shaft 16 rotated by the motor 15 and lifting up and down the elevating vase 13. Incidentally, an accordion 17 is provided between the lower face of the elevating base 13 and the upper face of the bed 1.

Therefore, when the motor 15 is rotated, the screw shaft 16 is rotated in the same direction as that of the motor 15, so that the elevating base 13 is lifted up or down in the Z-axis direction.

Figure 3:
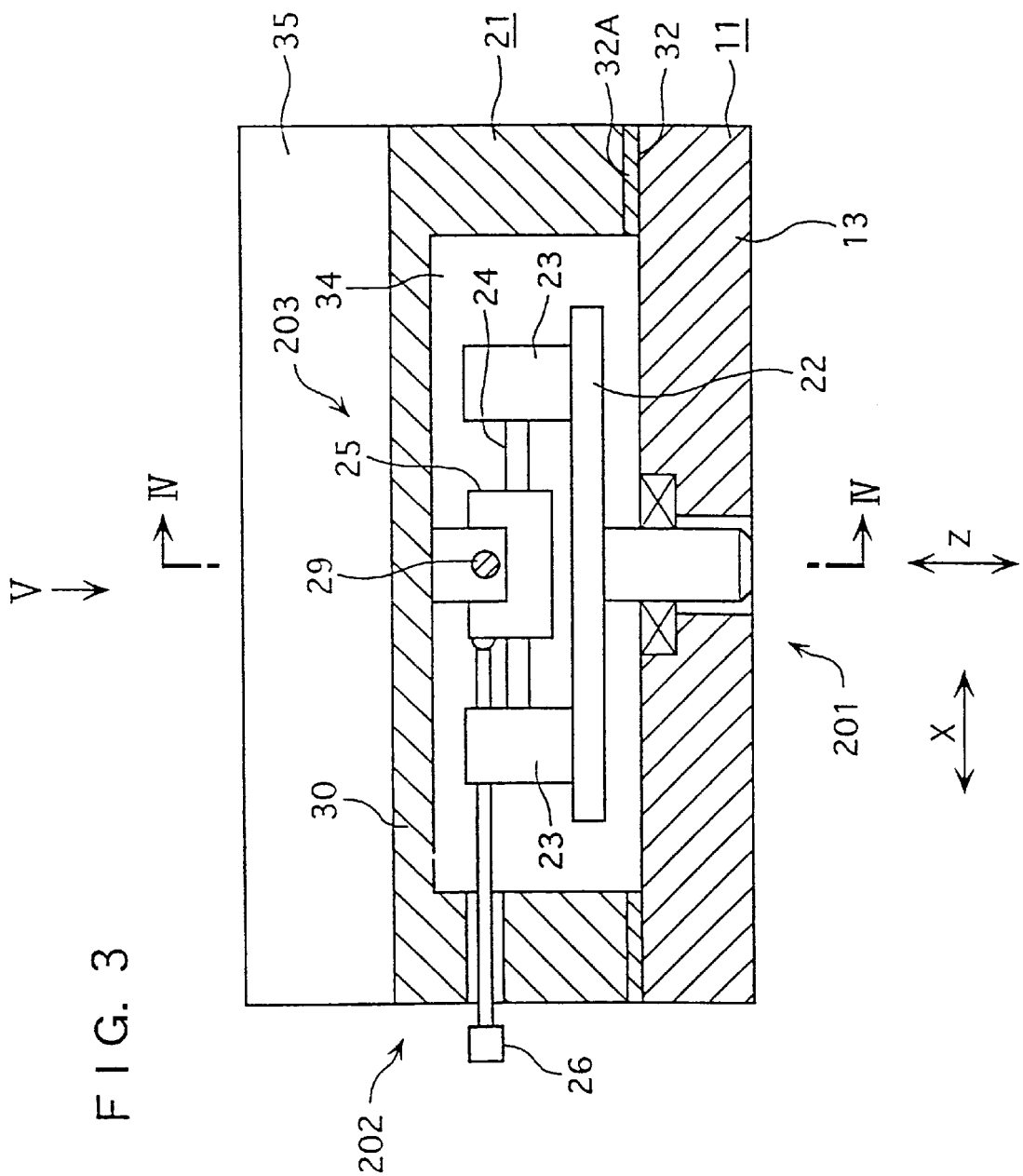
FIG. 3 is a fragmentary sectional view of the table device of FIG. 2.
Figure 4:
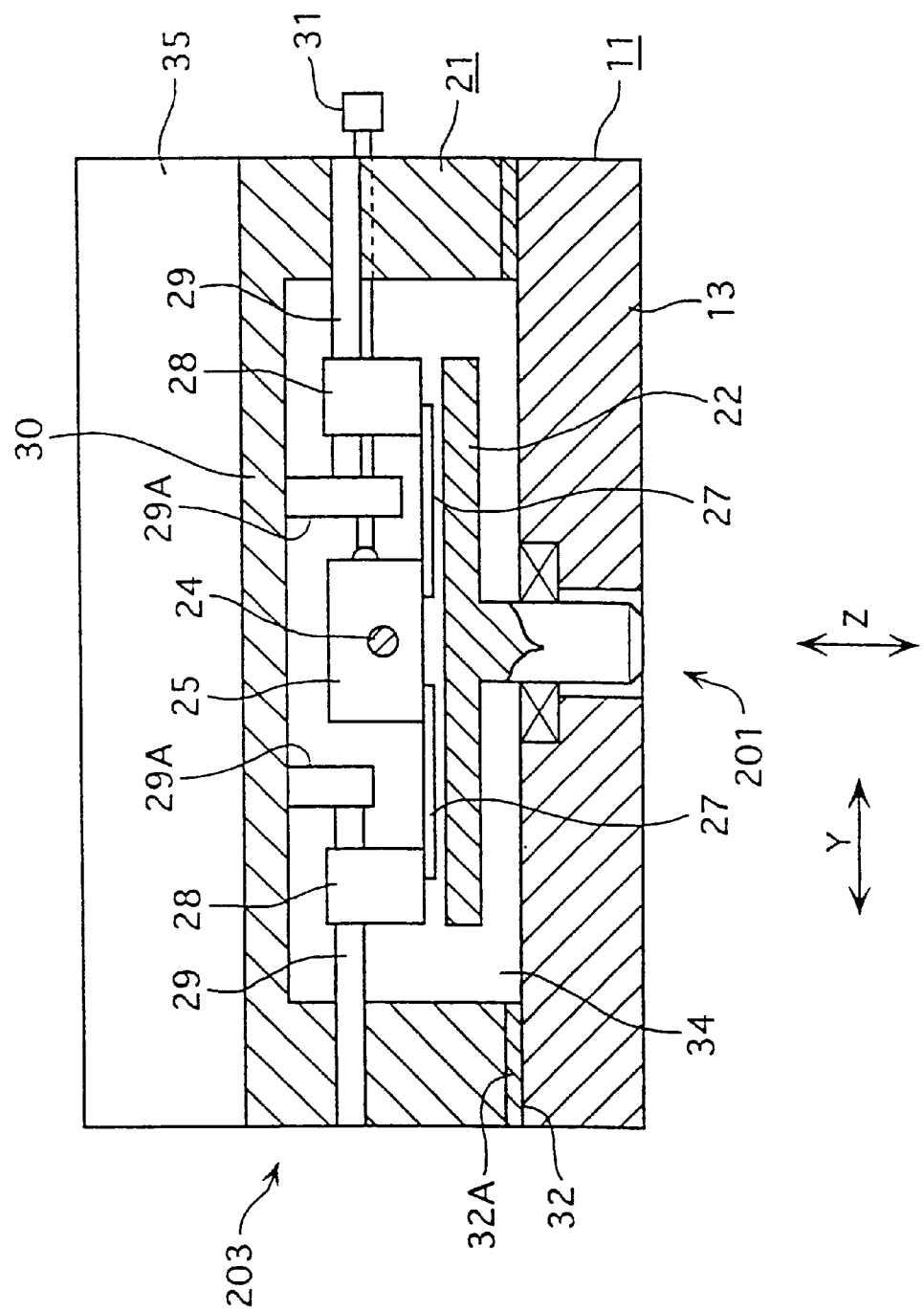
FIG. 4 is a sectional view taken along the IV—IV line in FIG. 3.

As shown in FIG. 3 and FIG. 4, the X-Y moving and rotating mechanism 21 is composed of: a rotatable board 22 rotatably provided on the elevating base 13; an X-slider 25 placed above the rotatable board 22 to move in the X-direction through a pair of supporting portions 23 and a guide rod 24; an X-slider adjusting screw 26 engaged with one of the supporting portions 23 and moving the X-slider 25 in the X-axis direction; a supporting portion 28 connected to the X-slider 25 through a plate spring 27 capable of elastically deforming in the Z-axis direction; a guide rod 29 movably placed in the supporting portion 28 in parallel to the Y axis; a Y-table 30 connected to the guide rod 29 through a connecting portion 29A; and a Y-table adjusting screw 31 screwed to the Y-table 30 and abutted to the X-slider 25 at the end thereof to move the Y-table 30 in the Y-axis direction.

In the above structure, the rotatable board 22 forms a rotating mechanism 201 for rotating the Y-table 30 about the Z axis. The supporting portion 23, the guide rod 24, the X-slider 25 and the X-slider adjusting screw 26 form a first linear moving mechanism 202 for linearly moving the Y-table 30 in the X-axis direction. And the plate spring 27, the supporting portion 28, the guide rod 29, the connecting portion 29A and Y-table adjusting screw 31 form a second linear moving mechanism 203 for linearly moving the Y-table 30 in the Y-axis direction.

A sliding face 32 is formed on the circular margin of the top surface of the elevating table 13. The sliding face 32 confronting the bottom face of the Y-table 30 receives the Y-table 30 itself and a load on the Y-table 30, and supports the Y-table 30 to rotatably and linearly move in the X-axis and Y-axis directions. The sliding face 32 is provided thereon with a lower frictional member 32A, such as Teflon resin. Incidentally, a ball bearing as well as Teflon resin can be used for the lower frictional member 32A. Under the Y-table 30 and inside the circle of the sliding face 32, a recess portion 34 is formed to accommodate the rotating mechanism 201, the first linear moving mechanism 202 and the second linear moving mechanism 203. A handle 33 is projected from the outer circumferential surface of the Y-table 30 (see FIG. 2). Note that a coil spring (not shown) for urging the X-slider 25 in an abutting direction to abut to the X-slider adjusting screw 26 and the Y-table adjusting screw 31, is placed between the rotatable board 22 and the Y-table 30.

Upon screwing the X-slider adjusting screw 26, the X-slider 25 is moved in the X-axis direction, whereby the Y-table 30 is also moved in the X-axis direction. Upon screwing the Y-table adjusting screw 31, the Y-table 30 is moved in the Y-axis direction. Upon rotating the handle 33, the Y-table 30 is rotated about the Z axis. That is to say the Y-table is moved in both X-axis and Y-axis directions, and rotated about the Z axis. In this time, a load on the table 30 is received on the top face of the elevating base 13 through the frictional member 32A, so that a large load is not applied to each moving mechanism (the moving mechanisms in the X-axis and Y-axis directions) and the rotating mechanism, thus smoothly carrying out the movement in the X-axis and Y-axis directions and the rotation about the Z axis.

Figure 5:
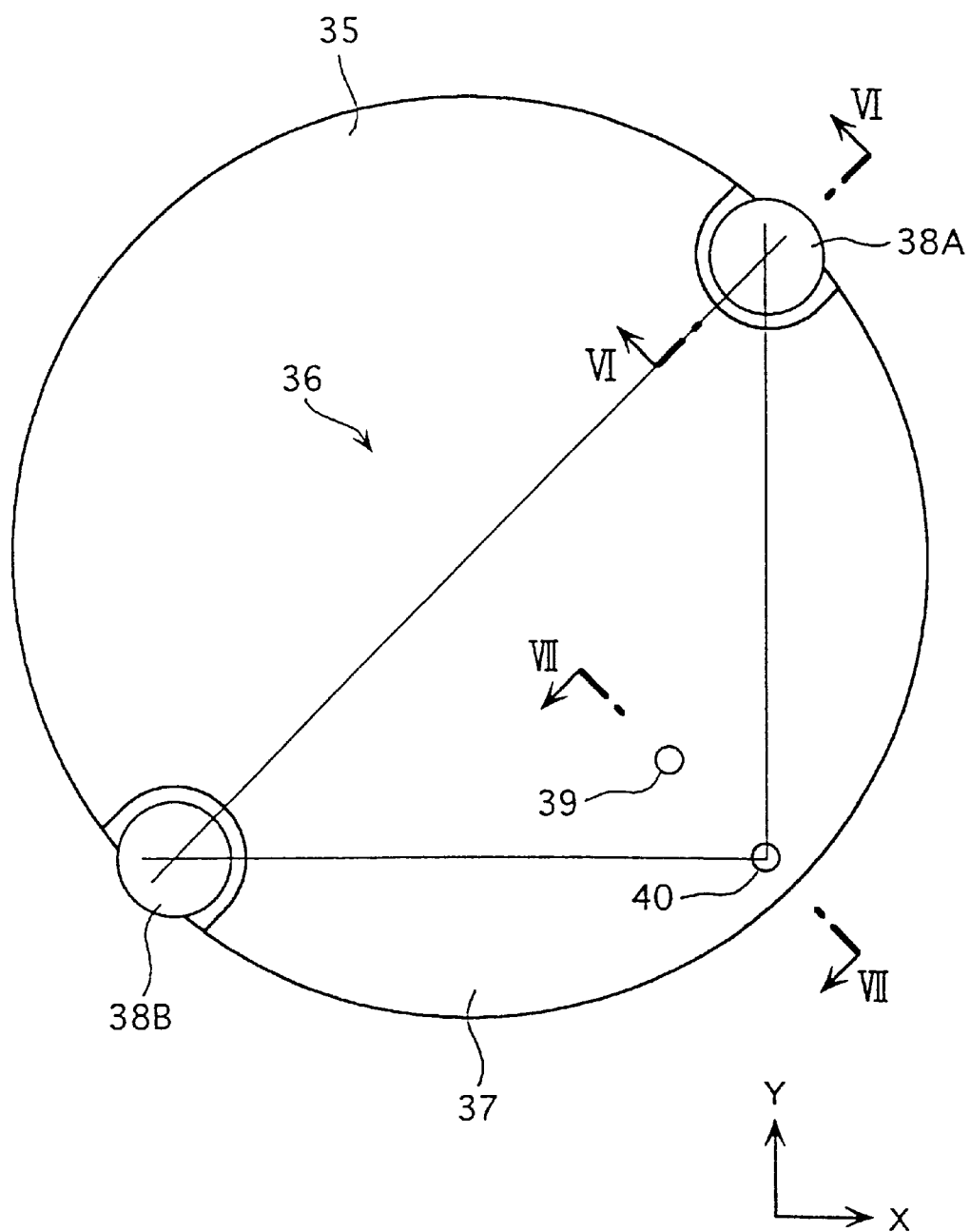
FIG. 5 is a view shown in the direction of the arrow V of FIG. 3.
Figure 6:
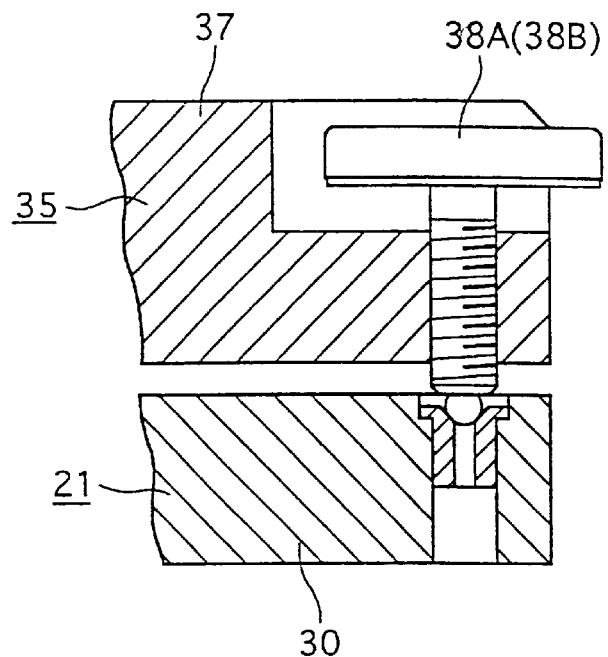
FIG. 6 is a sectional view taken along the VI—VI line in FIG. 5.
Figure 7:
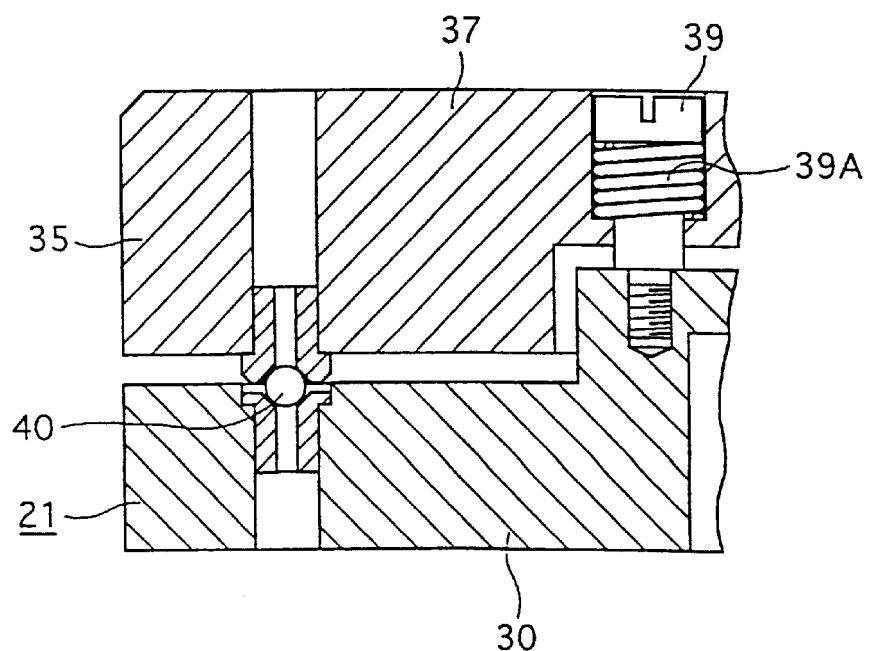
FIG. 7 is a sectional view taken along the VII—VII line in FIG. 5.

As shown in FIG. 5 to FIG. 7, the tilt adjusting mechanism 36 is composed of: two height adjusting screws 38A and 38B screwed on the object-attaching table 35 to be spaced at 180 degrees and abutted on the Y-table 30 at the lower end thereof; a ball 40 as a rocking fulcrum of the table 35, placed between the tables 30 and 35 and at the right-angled corner of a right-angled isosceles triangle having a hypotenuse formed by two points of the height adjusting screws 38A and 38B; a preloading screw 39 placed at a position closer to the center than the ball 40 and screwed through the object-attaching table 35 to the Y-table 30; and a pressurizing spring 39A placed between the head of the preloading screw 39 and the object-attaching table 35 and pressurizing the object-attaching table 35 toward the Y-table 30.

In a state shown in FIG. 5, when the height of the height adjusting screw 38A is adjusted, a tilt of the object-attaching table 35 to the Y axis is adjusted. When the height of the height adjusting screw 38B is adjusted, a tilt of the object-attaching table 35 to the X axis is adjusted.

Portal frame 41

As shown in FIG. 1, the aforementioned portal frame 41 is composed of a pair of pillars 42A and 42B standing up on the bed 1, and a tubular steel rail 43 of a quadrangular cross-section which is mounted on the top ends of the pillars 42A and 42B to form a link between the pillars. The rail 43 is divided in two tubular parts at a symmetrical axis E in a vertical direction of the quadrangular cross-section which will be described later. One of the divided tubular parts forms a first guiding face 44 for movably guiding the slider 51A. The other tubular part forms a second guiding face 45 for movably guiding the slider 51B.

Figure 8:
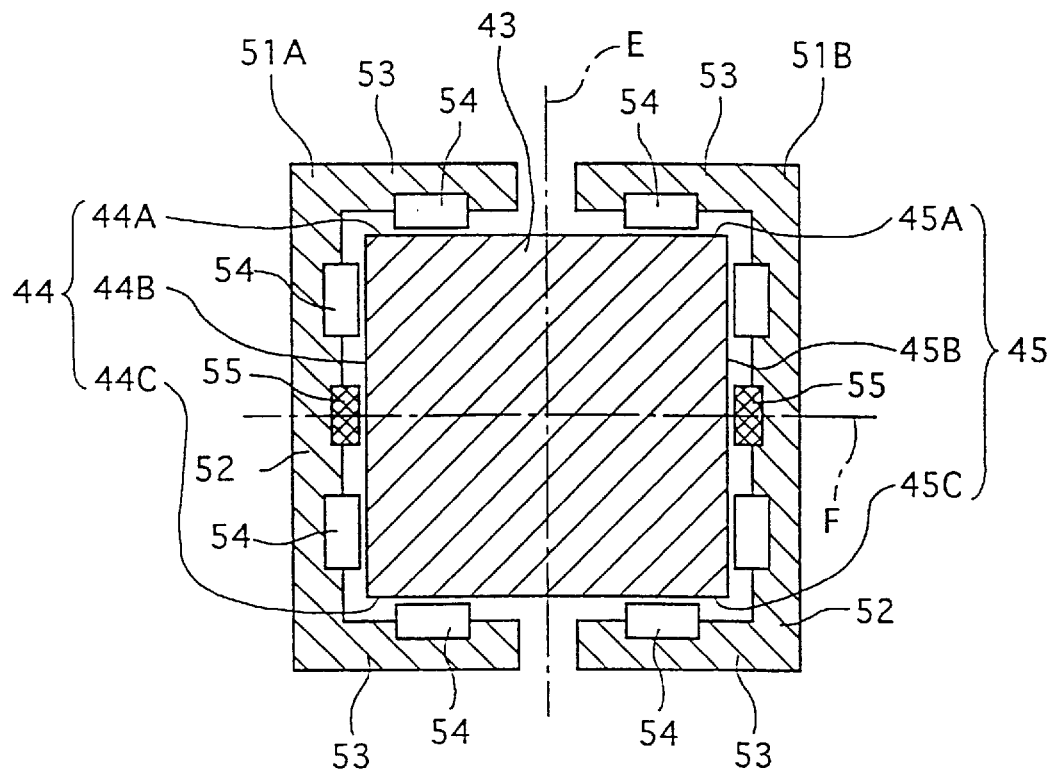
FIGS. 8(A) and 8(B) are diagrams showing a movement guiding mechanism of a slider relative to a rail of the preferred embodiment.
Figure 8:
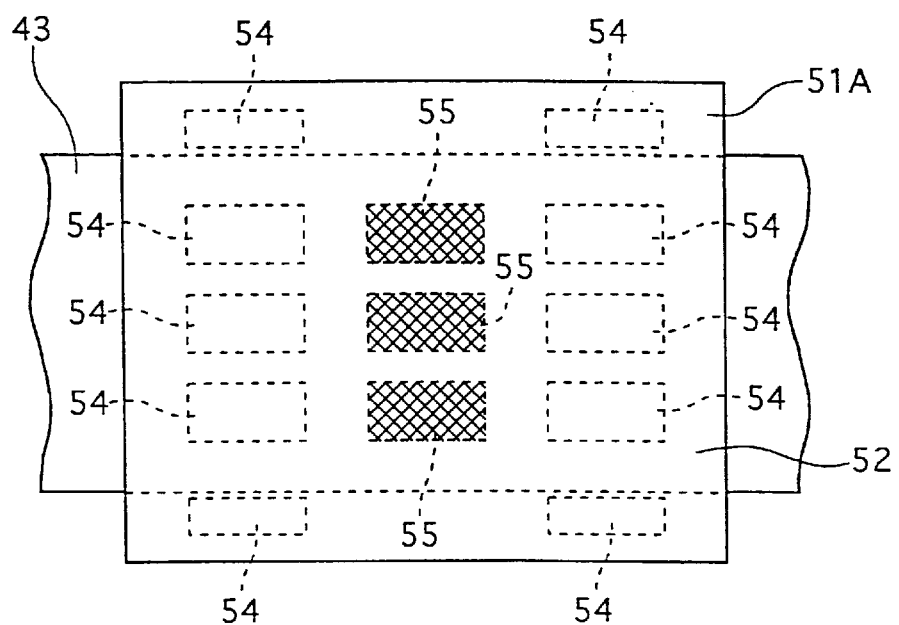

As shown in FIG. 8, the guiding faces 44 and 45 are formed to be symmetric with respect to the vertical axis E of the quadrangular cross-section of the rail 43, and respectively have top faces 44A and 45A as the top face of the tubular part, side faces 44B and 45B and bottom faces 44C and 44B.

Sliders 51A and 51B

As shown in FIG. 8, each of the sliders 51A and 51B has a sectional C-shape to cover each of the guiding faces 44 and 45, and is provided with a vertical portion 52 placed opposite each of the side faces 44B and 45B, and a pair of horizontal portions 53 extending from both ends of the vertical portion 52 at a right angle and placed opposite each of the top faces 44A and 45A and each of the bottom faces 44C and 45C.

On each of the vertical portions 52 and the horizontal portions 53 of the sliders 51A and 51B, plural air bearings 54 is provided. The air bearings 54 provided on a pair of the horizontal portions 53 is vertically symmetric with respect to a line of a horizontal axis F perpendicular to the vertical axis E of the quadrangular cross-section, and plural magnets 55 as an attracting means on the central area of the vertical portion 52 are located.

As a result, the sliders 51A and 51B are balanced by the repulsion caused by the plural air bearings 54, the attraction of the magnets 55, and the dead weight of the sliders 51 and 51B themselves, and held to have a space from each of the faces 44A, 45A, 44B, 45B, 44C and 45C of the rail 43.

More specifically, the vertically upward force, produced by the air bearing 54 which jets air toward the top face 44A of the first guiding face 44, is balanced by a combined force of the dead weight of the slider 51A and the vertically downward force produced by the air bearing 54 confronting the bottom face 44C. The horizontally outward force produced by the air bearing 54 placed on the vertical portion 52 is balanced by the attractive force between the magnet 55, placed in the central area of the vertical portion 52, and the steel rail 43.

Probes 91A and 91B

Figure 9:
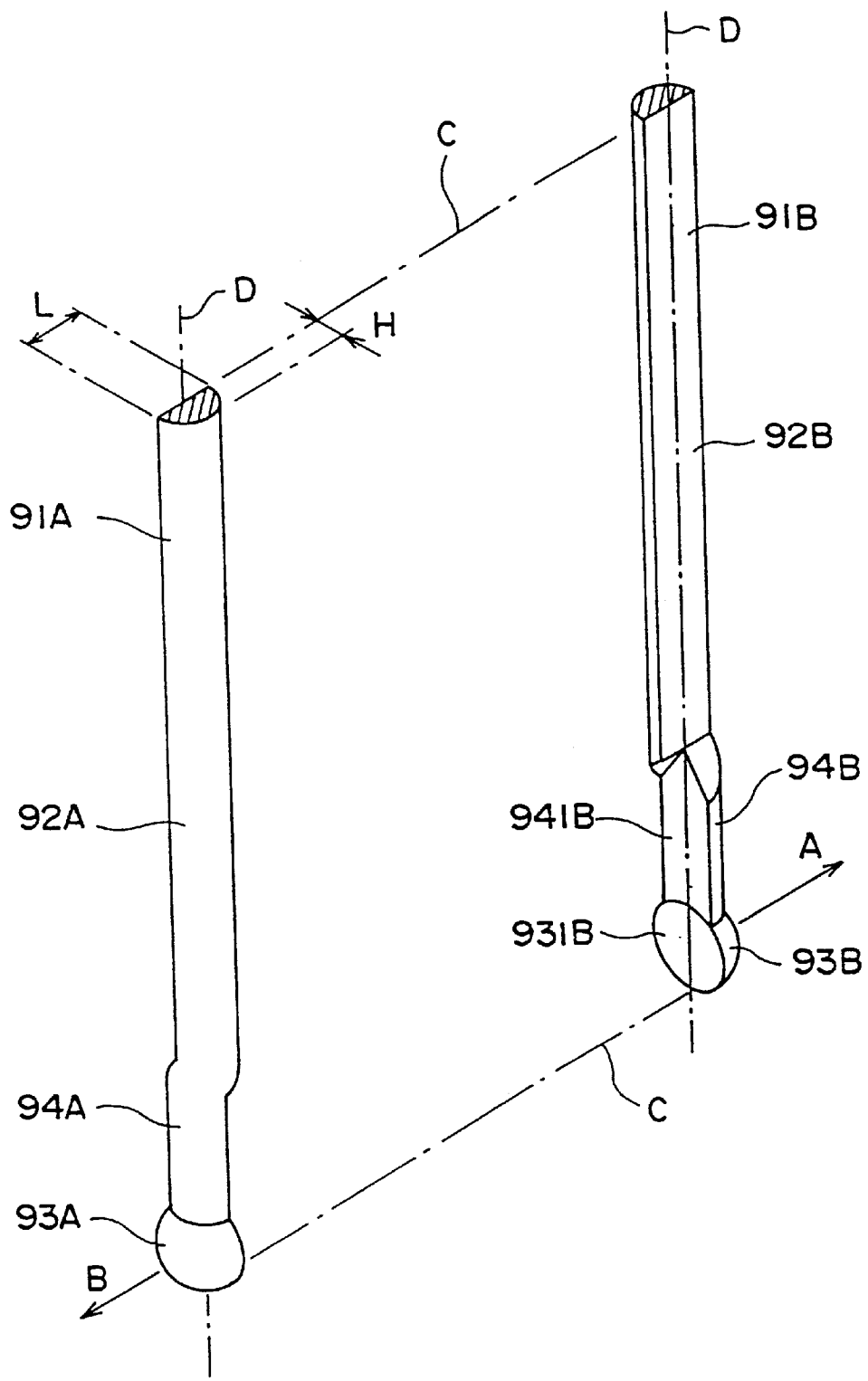
FIG. 9 is a perspective view of a probe of the preferred embodiment.

As shown in FIG. 9, the probes 91A and 91B are respectively provided with shafts 92A and 92B, approximately hemisphere-shaped contact portions 93A and 93B attached on the ends of the shafts 92A and 92B, and linking portions 94A and 94B linking the shafts 92A and 92B to the contact portions 93A and 93B.

The shafts 92A and 92B are made of steel or cemented carbide including tungsten carbide and have a stick-shape of a semi-circular cross-section having a length L and a height H. The base ends of the shafts 92A and 92B are respectively connected to the sliders 51A and 51B so that the straight line of the semi-circle is oriented along a moving axis C (the measurement axis).

The contact portions 93A and 93B are placed so that each of approximately hemisphere flat faces 931A and 931B is positioned perpendicular to the moving axis C. An area of the curved face of the hemisphere along the moving axis C is abutted to the inner circumferential face of the object, which will be described later.

Each of the linking portions 94A and 94B is approximately semi-circular cross-section of the shafts 92A and 92B being rotated in 90 degrees about an axis D of the shaft 92. Flat faces 941A and 941B corresponding to the straight portion of a semi-circle are perpendicular to the moving axis C and respectively placed along the flat faces 931A and 931B of the contact portions 93A and 93B.

When the probes 91A and 91B approach each other, the shafts 92A and 92B positioned on both sides of the moving axis C, and the assembled shafts 92A and 92B have an approximately circular cross-section. The flat faces of the probes 91A and 91B (the flat faces 931A and 931B of the contact portions 93A and 93B, and the flat faces 941A and 941B of the linking portions 94A and 94B and so on) are also abutted to each other. Therefore, the contact portions 93A and 93B form an approximate ball after being assembled.

Figure 10A:
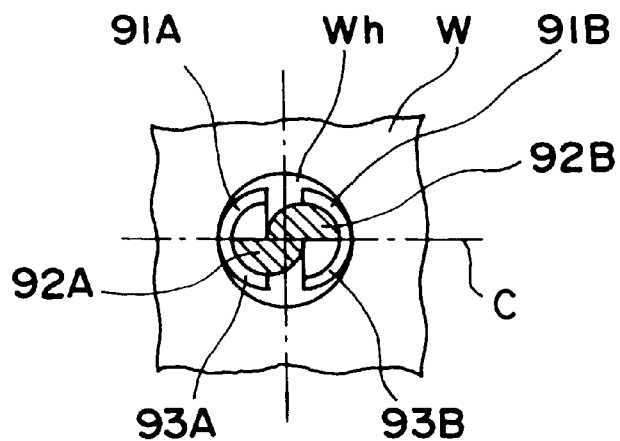
FIGS. 10A and 10B are drawings showing a state the probe of the preferred embodiment is inserted into a small hole.
Figure 10B:
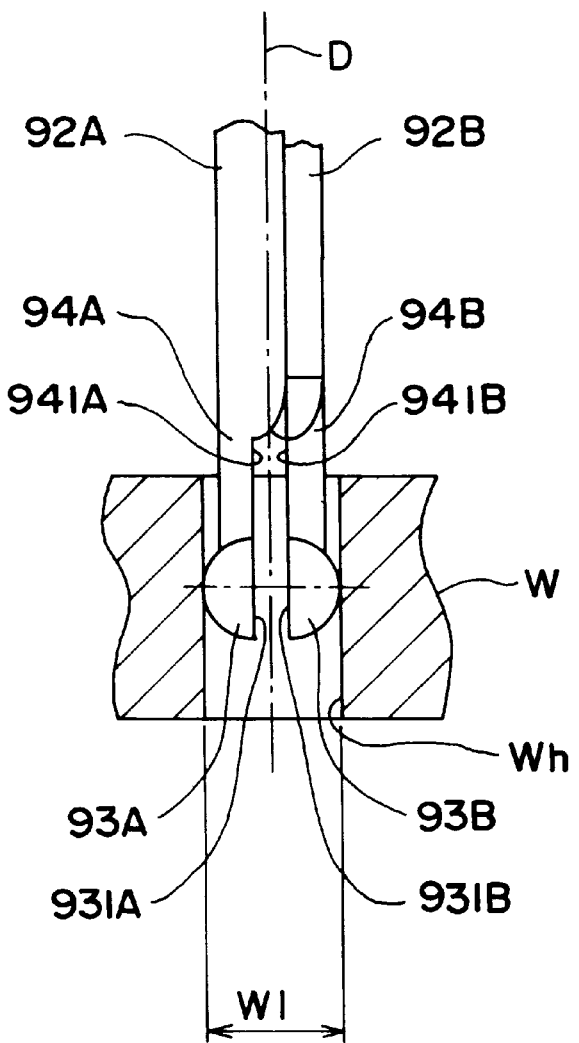

As shown in FIGS. 10A and 10B, when the inner diameter of a small hole Wh of the object W is measured with the pair of the probes 91A and 91B, after the pair of the probes 91A and 91B brought closer together is inserted into the small hole wh, the pair of the probes 91A and 91B is moved to open a space from each other, whereupon the contact portions 93A and 93B are abutted to the inner circumferential face of the small hole Wh. In this state, a value indicated on the measuring means 61 is read, resulting in the measurement for the inner diameter of the small hole Wh.

In fabricating the probes 91A and 91B, the shafts 92A and 92B and the linking portions 94A and 94B are formed by cutting a pole composed of steel or cemented carbide comprising tungsten carbide, and the approximately hemisphere-shaped contact portions 93A and 93B are formed by cutting a steel ball. The probes 91A and 91B are formed by brazing-welding the contact portions 93A and 93B to the ends of the linking portions 94A and 94B.

In the cutting-out process of each of the contact portions 93A and 93B from a steel ball, the steel ball is not cut out to be a complete hemisphere at the first stage. First, the cutting process is interrupted just before the cutting face reaches the center of the ball. And then, in this state, process such as brazing-connecting to the linking portions 94A and 94B are carried out. As the diameter of the approximately hemisphere-shaped contact portions 93A and 93B are left, it is possible to confirm the diameter of the approximate hemisphere. The maximum diameter area is grasped by clamping both sides of the cut faces, and the center of the hemisphere is found. As a result, when the probes 91A and 91B are attached to the sliders 51A and 51B, each center of the contact portions 93A and 93B can be adjusted to be properly positioned, so that the contact area to the object W is properly positioned on the moving axis C.

Table 1 shows the comparison of rigidity k and the amount of flexure δ of the aforementioned probes 91A and 91B with those of the conventional probes described earlier.

Figure 28A:
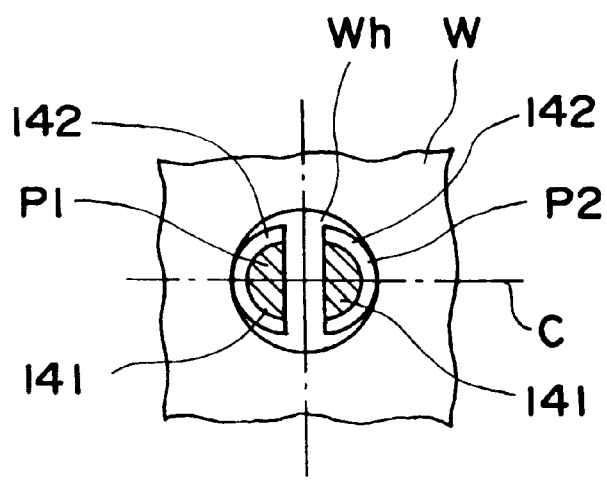
FIGS. 28A and 28B are drawings showing a state that another conventional probe is inserted into a small hole formed on an object to be measured in an inner-diameter measurement.
Figure 28B:
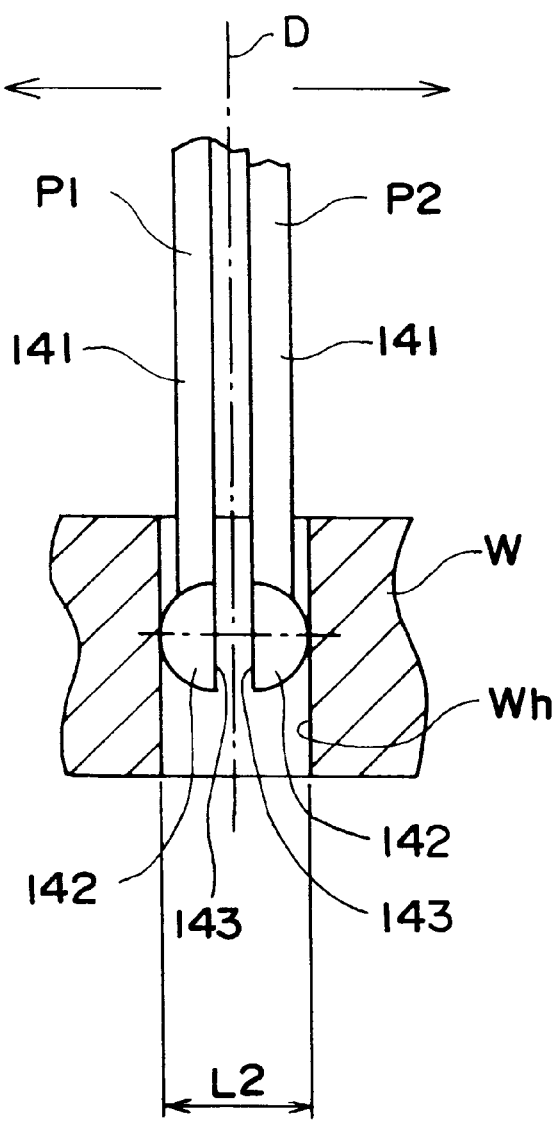

Incidentally, in Table 1, "Embodiment" means the contact type probe 91A shown in FIGS. 10A and 10B. "Conventional example 1" means the contact type probes P1 and P2 shown in FIGS. 27A and 27B. And "Conventional example 2" means the contact type probes P1 and P2 shown in FIGS. 28A and 28B.

The material used for the shafts 92A, 92B, 131 and 141 is the extremely rigid steel or cemented carbide comprising tungsten carbide. Each probe is sized so that a pair of probes can be inserted into a small hole.

The amount of flexure δ is the amount of flexure of each of the contact portions 93A, 93B, 132 and 142 when repulsion P=0.1N acts on each of the contact portions 93A, 93B, 132 and 142.

TABLE 1

| Shaft configuration of probe | Geometric moment of inertia I (mm⁴) | Rigidity k (N/mm) | Flexure amount δ (μm) |
|---|---|---|---|
| Conventional example 1 | 0.515 | 6550.8 | 15.3 |
| Conventional example 2 | 1.15 | 14628.0 | 6.8 |
| Embodiment | 4.12 | 52406.4 | 1.9 |

Rigidity: $k = 3EI/S^3$
E: Young's modulus $5.3 \times 10^5$ N/cm²
I: Geometric moment of inertia of the shaft
Calculated according to the following sectional shape of the shaft
Conventional example 1;
L = 1.8 mm circular cross-section
$I = \pi L^4/64$
Conventional example 2;
L × H = 1.8 mm × 3.6 mm semi-circular cross-section
$I = (\pi/8 - 8/9\pi) \cdot L^4$
Embodiment;
L × H = 3.6 mm × 1.8 mm semi-circular cross-section
$I = \pi L^4/128$
S: the length of the probe along the axis 50 mm Measuring means 61

As shown in FIG. 1, the measuring means 61 is composed of a scale 62 provided on the slider 51A, and a detector 63 provided on the slider 51B oppositely to the scale 62. The scale 62 and the detector 63 are positioned on the measurement axis formed by connecting the contact portions 93A and 93B of the probes 91A and 91B.

Urging means 71

As shown in FIG. 1, the urging means 71 is composed of a wire 73 of which an end portion is connected to each of the sliders 51A and 51B and the other end portion is rotatably wound on a pulley 72 supported on the end of the rail 43, and a weight 74 connected to the end of the wire 73. Incidentally, the pully 72, wire 73 and weight 74 which comprise the urging means 71 for urging slider 51B is located behind the rail 43 and the pillar 42B and are not shown in the drawings. The sliders 51A and 51B are moved toward each other by the retraction of piston rods of cylinders 75A and 75B mounted on the top face of the rail 43, and moved to separate from each other through the urging means 71 by the extension of the piston rods of the cylinders 75A and 75B.

Probe drive controlling means 81

Figure 11:
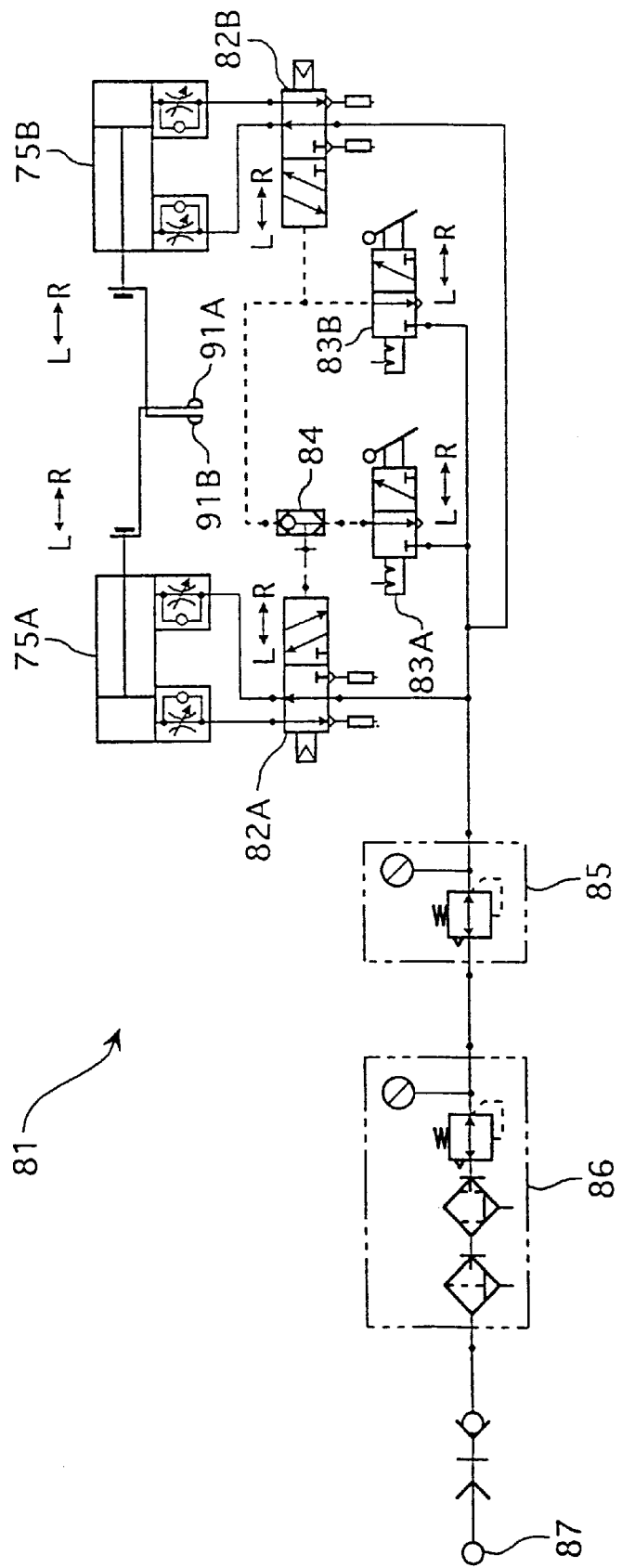
FIG. 11 is a schematic air-circuit diagram showing a probe drive controlling means of the preferred embodiment.

As shown in FIG. 11, the probe drive controlling means 81 is composed of: air controlling valves 82A and 82B connected to the cylinders 75A and 75B; manual control valves 83A and 83B connected to the air controlling valves 82A and 82B; a shuttle valve 84 placed between the manual control valves 83A and 83B and the air controlling valve 82A; a regulator 85; an air cleaning unit 86; and an air source 87.

In FIG. 11, air sent out from the air source 87 flows through the air controlling valves 82A and 82B to the cylinders 75A and 75B, so that the piston rod of the cylinder 75A is moved in a direction L and the piston rod of the cylinder 75B is moved in a direction R. Therefore, the pair of the probes 91A and 91B is closed.

In this state, upon sliding the manual control valve 83B in a direction L, the air from the air source 87 flows along a route shown with a dotted line, so that the air controlling valve 82B is slid in a direction R and the air controlling valve 82A is slid in a direction L, whereupon the piston rod of the cylinder 75B is slid in a direction L and the piston rod of the cylinder 75A is slid in a direction R. Thereby, the sliders 51A and 51B are slid in a direction to separate from each other by the urging means 71. That is, the pair of the probes 91A and 91B are opened.

Upon sliding the manual control valve 83B in a direction R (sliding back) and the manual control valve 83A in a direction L, the air flows through the manual control valve 83A to the sole air controlling valve 82A, so that the air controlling valve 82A is slid in a direction L, whereupon the piston rod of the cylinder 75A is slid in a direction R. Thereby, the slider 51A is slid in the separating direction by the urging means 71. That is, the sole probe 91A is moved.

Operation

The operation of the embodiment will be described below.

After the object W is put on the object-attaching table 35, the measurement is carried out by the following steps.

(1) Measuring position adjustment (the adjustment for aligning the measurement axis with the diametral position of the object W and the measurement axis)

Figure 12:
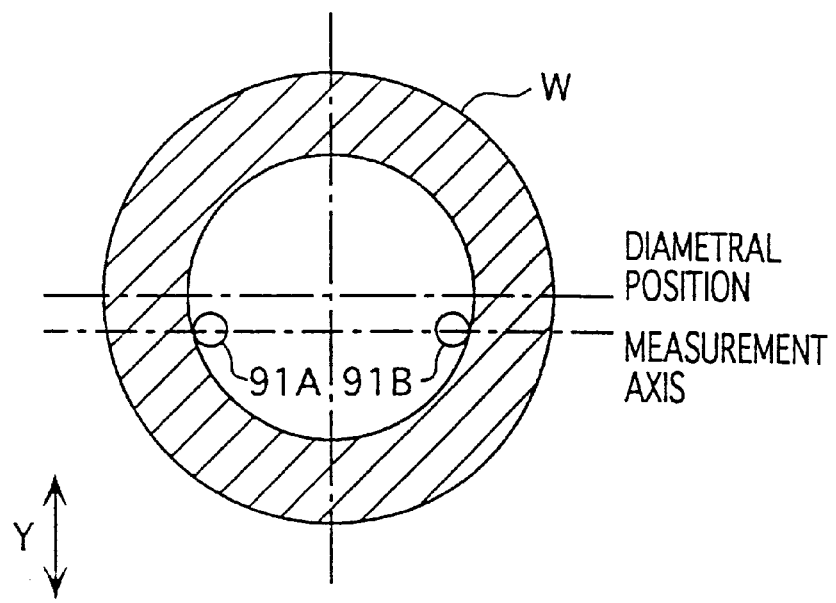
FIG. 12 is a drawing showing a state that a diametral position of an object to be measured differs from a measurement axis in an inner-diameter measurement in the preferred embodiment.
Figure 13:
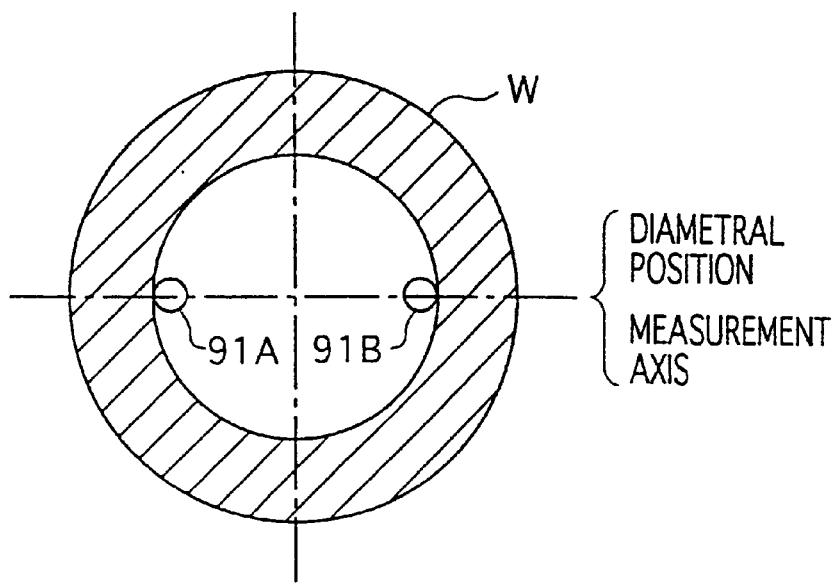
FIG. 13 is a drawing showing a state that the diametral position of the object to be measured and the measurement axis are aligned in the inner-diameter measurement in the preferred embodiment.

As shown in FIG. 12, in a state that the pair of the probes 91A and 91B is abutted to the inner circumferential face of the object W by the probe drive controlling means 81, a space between the pair of the probes 91A and 91B is measured by the measuring means 61 while the Y-table 30 is being moved in the Y-axis direction. The pair of the probes 91A and 91B is positioned at a position that the space between the pair of the probes 91A and 91B is maximum. Thereby, as shown in FIG. 13, the diametral position of the object W and the measurement axis are aligned.

(2) Tilt adjustment (the adjustment for correcting a tilt of the axis of the inner diameter of the object W relative to the axis line perpendicular to the measurement axis)

Figure 14:
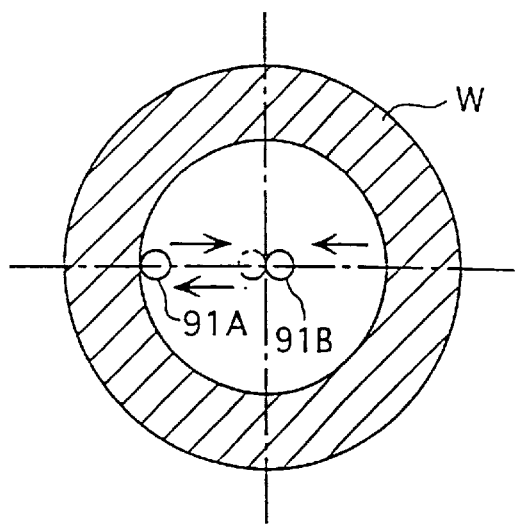
FIG. 14 is an explanatory view of adjustment for correcting a tilt of the axis of the inner diameter of the object to be measured with respect to an axis line perpendicular to the measurement axis in the preferred embodiment.
Figure 15:
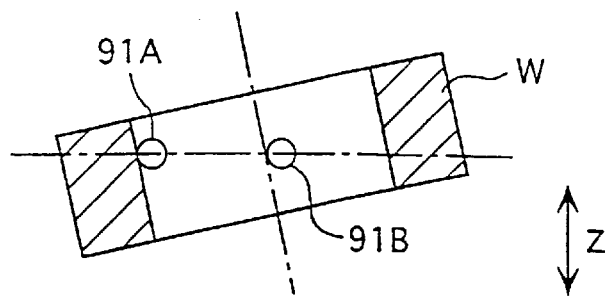
FIG. 15 is a sectional view of FIG. 14.
Figure 16:
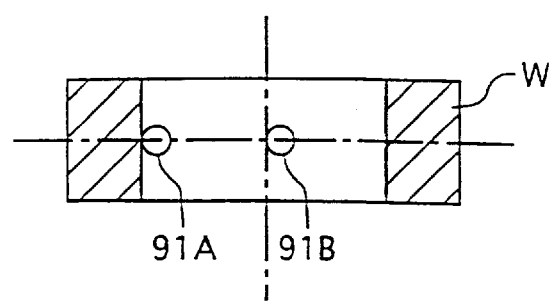
FIG. 16 is a view showing the adjusted state of FIG. 14 and FIG. 15.

As shown in FIG. 14, after the pair of the probes 91A and 91B is moved toward each other by the probe drive controlling means 81, the sole probe 91A is moved to abut to the inner circumferential face of the object W. Continuously, as shown in FIG. 15, the value indicated on the measuring means 61 is read while the object W is elevated in the Z-axis direction by elevating the elevating base 13. At this time, the tilt in the X-axis direction is adjusted by the tilt adjusting mechanism 36 so that change in values indicated on the measuring means 61 is minimized. Thereby, as shown in FIG. 16, the axis of the inner diameter of the object W and the axis line perpendicular to the measurement axis are aligned.

(3) Rotation of object

Upon rotating the handle 33 projected from the Y-table 30, the rotatable board 22 is rotated with respect to the elevating base 13, so that the Y-table 30 is rotated in 90 degrees. Thereby, the object W is rotated in 90 degrees.

(4) Diameter position adjustment

The operations in step (1) are repeated. Thereby, the measuring positions in the X-axis and Y-axis directions are adjusted.

(5) Tilt adjustment

The operations in step (2) are repeated. Thereby, the tilts in the X-axis and Y-axis directions are corrected.

(6) Measurement

After the diametral position of the inner diameter of the object W and the measurement axis are aligned through the adjustment in step (1), the pair of the probes 91A and 91B is abutted to the inner circumferential face of the object W while being relatively moved along the direction of the measurement axis. At this time, the space between the pair of the probes 91A and 91B is read from the measuring means 61. After the Y-table 30 is rotated in 90 degrees, the similar operation is carried out and the space between the pair of the probes 91A and 91B is read from the measuring means 61. Thereby, the inner diameters of the object W in two directions perpendicular to each other are measured.

Effects of the embodiment

According to the embodiment described above, with the selective use of the pair of the probes 91A and 91B, the adjustment for aligning the measurement axis with the diametral position of the object W and the adjustment for correcting a tilt of the axis of the inner diameter of the object W relative to the axis line perpendicular to the measurement axis are carried out, so that the adjustments are effortlessly and properly carried out.

On the grounds that the pair of the probes 91A and 91B is used in the adjustment for aligning the measurement axis with the diametral position of the object W, there is not a disadvantage produced in the adjustment with using single probe, namely, a disadvantage that the error element has effect on the measured values when the moving error element in the direction of the measurement axis is in the relative moving mechanism of the probe and the object to be measured. Moreover, the sensitivity of detection is twice as higher as that in the measurement with the use of single probe. Concerning the processes of the adjustment for correcting the tilt of the axis of the inner diameter of the object W with respect to the axis line perpendicular to the measurement axis, since the sole probe 91A is used, there is no disadvantage in adjustment with the use of two probes. In consequence, the adjustments are carried out smoothly and precisely.

Since the pair of the probes 91A and 91B is simultaneously moved in the opening and closing direction by the probe drive controlling means 81, the above adjustment with the use of the pair of the probes 91A and 91B is carried out quickly. Since the probe drive controlling means 81 can move only the probe 91A in the opening and closing direction, the above adjustment with the use of the sole probe 91A is also performed quickly.

When the probes 91A and 91B are moved to be abutted to the inner circumferential face of the object W, namely in the opening direction, the abutting pressure can be appropriately controlled by changing the weight of the weight 74 of the urging means 71.

Since the table device 10 for putting the object W has: the rotating mechanism 201 to rotate the Y-table 30 about the Z axis, the first linear moving mechanism 202 to straight move the Y-table 30 in the X-axis direction, and the second linear moving mechanism 203 for linearly moving the Y-table 30 in the Y-axis direction, the measurement in the directions of two axes perpendicular to each other (in the X-axis and Y-axis directions) can be carried out by only rotating the Y-table 30 without reloading the object W.

Through the processes of the measuring position adjustment and the tilt adjustment, the diametral position and the tilt are adjusted with respect to a direction of the inner diameter of the object (e.g., the X-axis direction). Continuously, the Y-table 30 is rotated about the Z axis. After that, through processes of the measuring position adjustment and the tilt adjustment again, the diameter position adjustment and the tilt adjustment are performed with respect to the Y-axis direction of the inner diameter of the object. In consequence the measurement relative to two directions of the inner diameter of the object W can be performed without reloading the object W.

The rotating mechanism 201 includes the rotatable board 22 provided above the elevating base 13 to be rotated about the Z axis. The first linear moving mechanism 202 includes the guide rod 24 provided above the upper face of the rotatable board 22 via the supporting portion 23 to be parallel to the X axis, and the X-slider 25 movably provided to the guide rod 24. The second linear moving mechanism 203 includes the supporting portion 28 connected through the plate spring 27 to the X-slider 25, the guide rod 29 movably provided to the supporting portion 28 and being parallel to the Y axis, and the connecting portion 29A connecting the guide rod 29 and the Y-table 30, that is to say the second linear moving mechanism 203 has the plate spring 27 capable of being elastically deformed in the Z-axis direction. On the grounds of the above structure, even when the Y-table 30 is deformed in the Z-axis direction by a load on the Y-table 30, the plate spring 27 absorbs the deformation, so that the load on the Y-table 30 exerts no influence upon the mechanisms 201, 202 and 203.

On the top face of the elevating base 13, the sliding face 32, confronting the bottom face of the Y-table 30 to receive the Y-table 30 and the load on the Y-table 30, and supporting the Y-table 30 to move in two directions of the X axis and the Y axis and rotate about the Z axis, is formed, so that the weight of the Y-table 30 and the load on the Y-table 30 are received on the sliding face 32 of the elevating base 13. As a result, the deformation of the mechanisms 201, 202 and 203 for moving the Y-table 30 can be avoided and the high accuracy is ensured. Moreover, the freedom from a large-scale and complicated structure to avoid the deformation of the mechanisms 201, 202 and 203 reduces cost.

Since the sliding face 32 is formed on the circumference having the Z axis as the center, even when the object W is placed off-center on the table 35, the Y-table 30 can be movably supported on the elevating base with its stable attitude. And furthermore, the lower frictional member 32A is placed on the sliding face 32, so that the Y-table 30 is moved smoothly.

The recess portion 34 is formed inside the sliding face 32 formed on the circle and under the Y-table 30. The rotating mechanism 201, the first linear moving mechanism 202 and the second linear moving mechanism 203 are accommodated in the recess portion 34, thereby achieving the measuring instrument having a compact structure.

The pair of the probes 91A and 91B does not pass through the table device 10, and extends downward from the pair of the sliders 51A and 51B supported by the rail 43, so that the length of the probes 91A and 91B can be minimized in accordance with the depth in the thickness direction of the object W, and the measurement error caused by the aforementioned flexural deformation of the probe can be reduced, thereby extremely improving the accuracy of the measurement and omitting the relative measurement with the standard sample.

Figure 21:
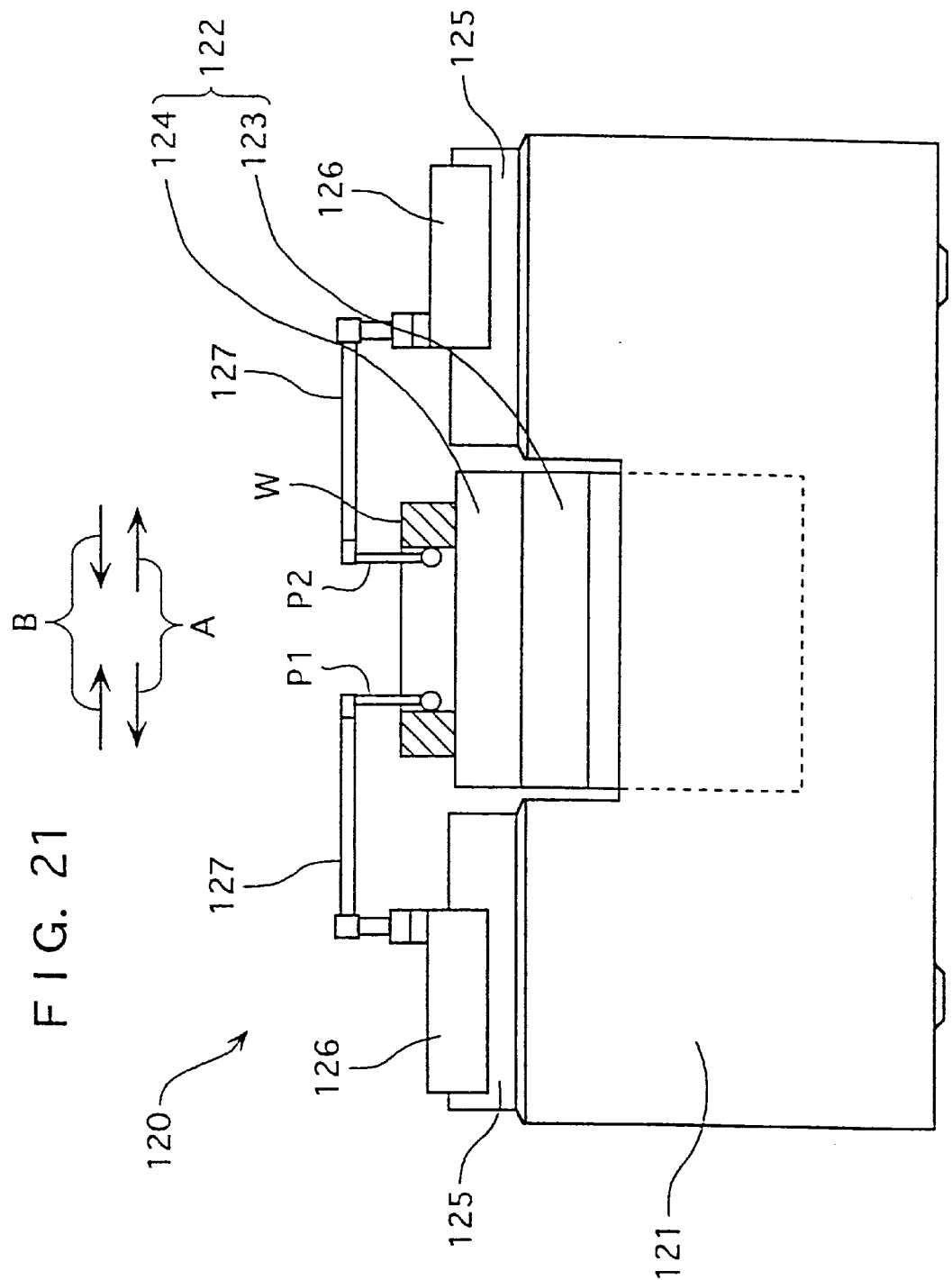
FIG. 21 is a drawing of another conventional inner and outer dimension measuring instrument.
Figure 22:
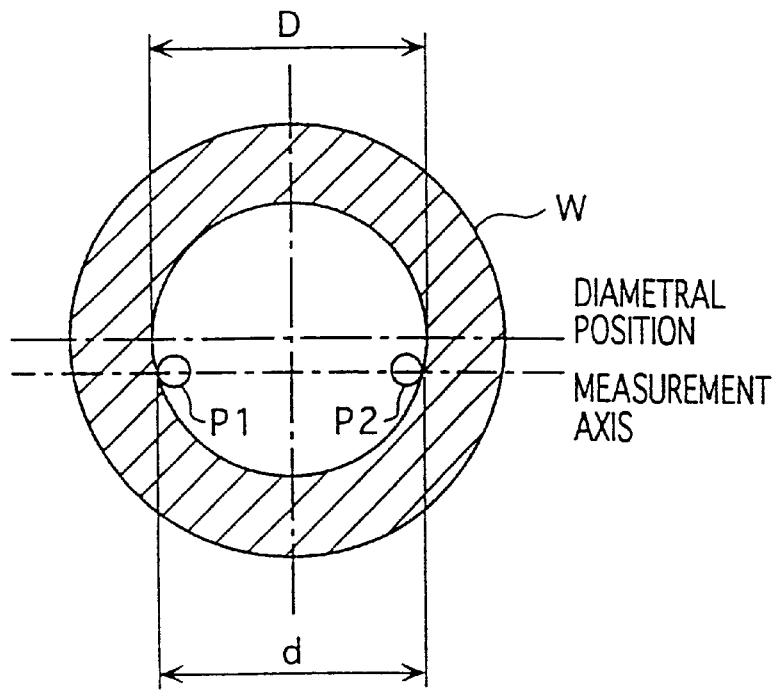
FIG. 22 is a drawing showing a state that a diametral position of an object to be measured differs from a measurement axis in an inner-diameter measurement.
Figure 23:
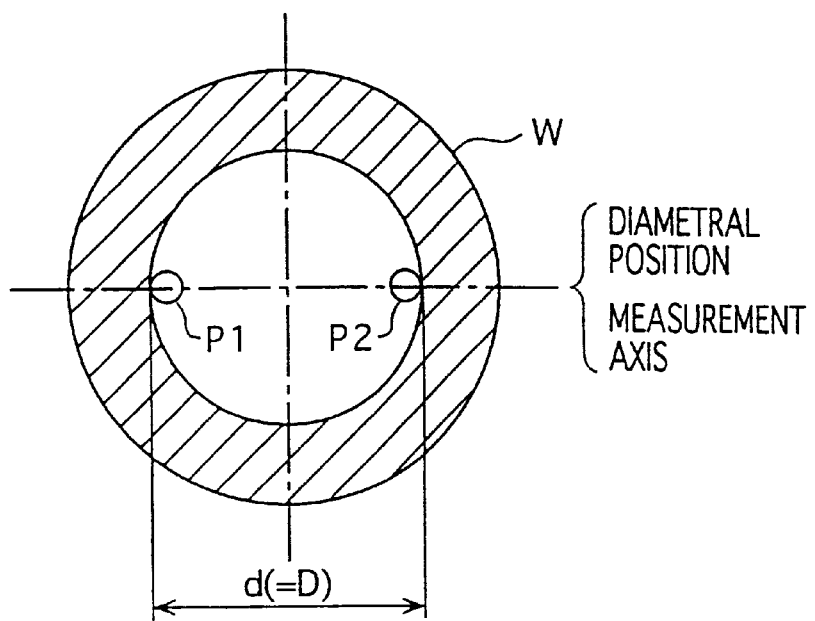
FIG. 23 is a drawing showing a state that the diametral position of the object to be measured and the measurement axis are aligned in the inner-diameter measurement.
Figure 24:
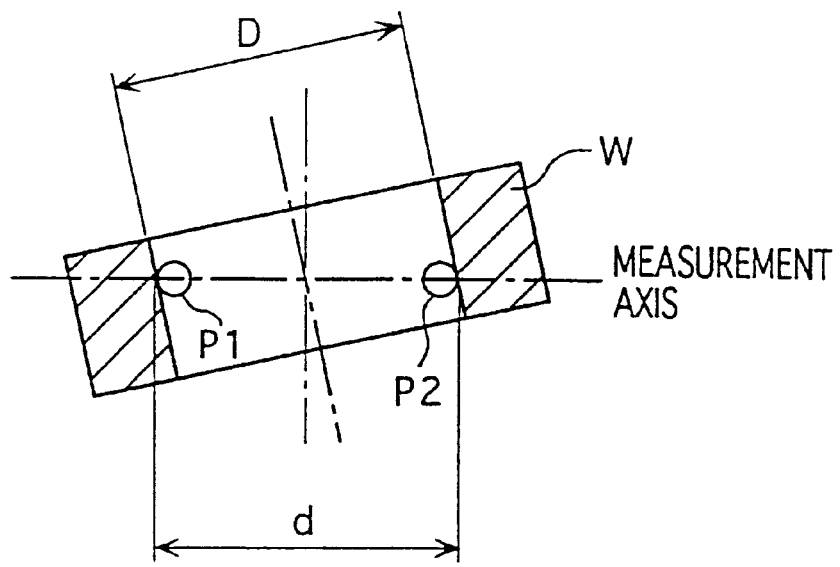
FIG. 24 is a drawing showing a state that the axis of the inner diameter of the object to be measured is tilted with respect to an axis line perpendicular to the measurement axis in the inner-diameter measurement.
Figure 25:
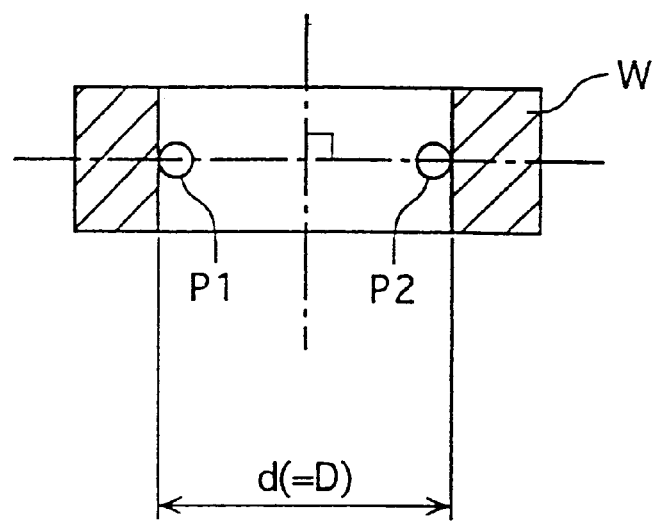
FIG. 25 is a drawing showing a state that the axis of the inner diameter of the object to be measured and the axis line perpendicular to the measurement axis are aligned in the inner-diameter measurement.
Figure 26:
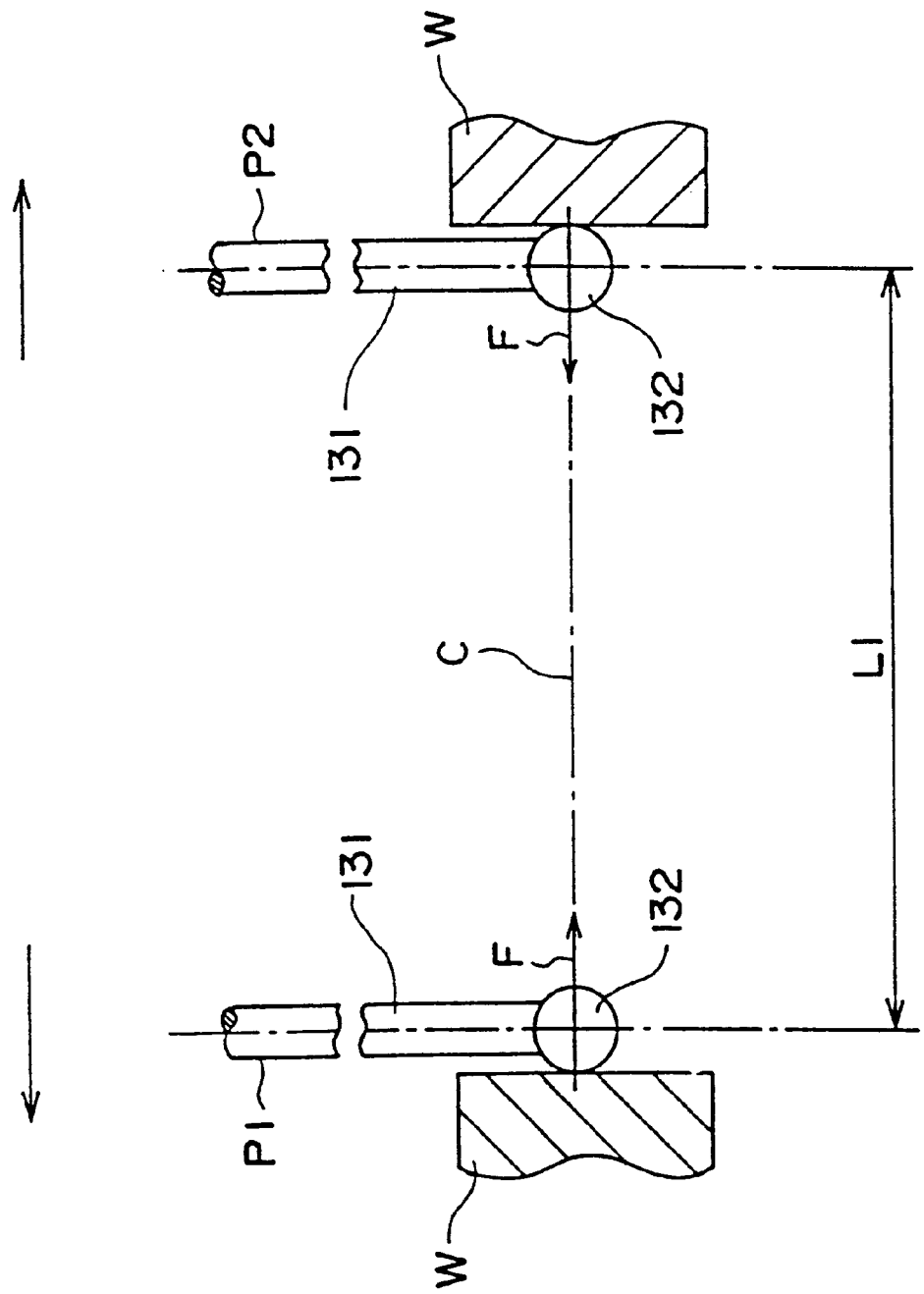
FIG. 26 is a drawing showing a state that a conventional probe is abutted to the inner side-face of the object to be measured in the inner-diameter measurement.

Since the rail 43 supporting the pair of the sliders 51A and 51B constitutes the portal frame 41 supported by the pillars 42A and 42B which are located at both ends of the rail, the arm for extending 127 of the conventional inner and outer dimension measuring instrument shown in FIG. 21 is not needed, therefore the simplified structure is achieved. The omission of the arm results in the cancellation of the measurement error caused by the flexure of the arm, thereby further improving the accuracy of the measurement for the inner and outer dimension of the object W.

The first guiding face 44 and the second guiding face 45 are dividingly provided on the whole length of the single rail 43, thereby avoiding unnecessarily over-sized measuring instrument. Moreover, the movable attachment of the pair of the sliders 51A and 51B to the one rail 43 eliminates the need for a precisely positioned arrangement of the plural rails in the moving direction of the probe, thereby simplifying the structure of the measuring instrument.

With the use of the air bearing 54 between the rail 43 and each of the sliders 51A and 51B, movement resistance between the rail 43 and each of the sliders 51A and 51B is reduced to nearly zero, so that the flexure of the probes 91A and 91B does not have large changes, and the extremely high accurate measurements can be performed by this measuring instrument.

Since the magnet 55 as the attracting means for producing attractive force neutralizing repulsion by the air bearing 54 is placed on each of the sliders 51A and 51B, it is not needed that an groove, extending along a extending direction of the rail, or the like is formed on the rail in order to prevent the sliders 51A and 51B from falling, resulting in the measuring instrument having the further simplified structure.

When the pair of the probes 91A and 91B is moved to approach with each other, the shafts 92A and 92B are respectively positioned on both sides of the moving axis C, so that each cross-sectional shape of the shafts 92A and 92B of the pair of the probes 91A and 91B is smaller, therefore the pair of the contact type probes 91A and 91B can be easily inserted into the small hole Wh.

The rigidity of the shafts 92A and 92B in the longitudinal direction thereof can be enhanced due to the fact that the length L of each cross-section of the shafts 92A and 92B is sufficiently ensured, so that the flexural deformation of the shafts 92A and 92B, which is caused by the repulsion, is reduced, thereby attaining the accurate measurement of the inner dimension of the small hole Wh.

Note that, as shown in Table 1, the rigidity of the aforementioned probe 91A is eight times larger than that of the probes P1 and P2 in the conventional example 1, and nearly 3.6 times larger than that of the probes P1 and P2 in the conventional example 2. Additionally, it is clear that the amount of flexure δ is also decreased extremely.

The rigidity of the shafts 92A and 92B is ensured, so that the possibility of the residual distortion or the like occurring in the probes 91A and 91B is decreased even when the repulsion F is decreased. As a result, the inner dimension measurement of the small hole Wh is carried out with high reliability.

Each cross-section of the shafts 92A and 92B of a pair of the contact type probes 91A and 91B has an approximately circular shape, so that the inner dimension measurement can be performed irrespective of the configuration of the small hole Wh, such as a round hole or a square hole.

The linking portions 94A and 94B are respectively formed at the ends of the shafts 92A and 92B, so that a larger area to be brazing-welded with the hemispherical-shaped contact portions 93A and 93B respectively connected to the lower parts of the linking portions can be obtained, thereby fabricating the probes 91A and 91B with the high strength.

Since the contact portions 93A and 93B have a hemispherical shape, the combination formed when the pair of the probes 91A and 91B is moved to approach each other has an approximately ball shape, thus the probes are further easily inserted into the small hole Wh.

A relative distance between the pair of the probes 91A and 91B is measured by the one scale 62 and the one detector 63 which are respectively placed in the sliders 51A and 51B. As a result, as compared with measurement in which measured values are read with two detectors relative to one scale as described in the conventional method, the dimension measuring mechanism and the reduction of the production costs can be simplified.

OTHER EMBODIMENTS

It is to be understood that the present invention is not intended to be limited to the aforementioned embodiment, and the following modifications are also included in the scope of the present invention.

Figure 17:
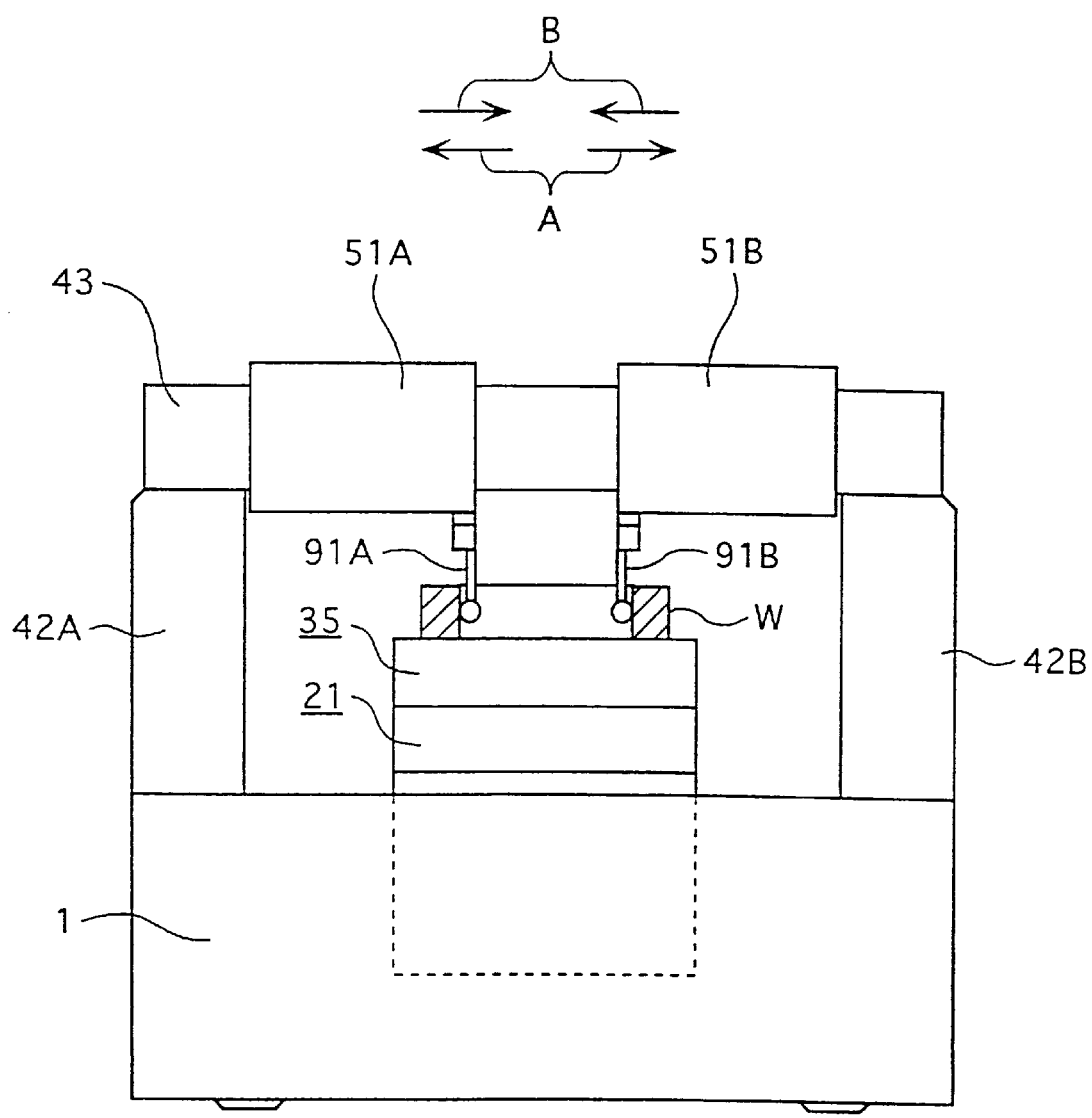
FIG. 17 is a drawing of another preferred embodiment of a movement guiding mechanism of a slider relative to a rail.

More specifically, the present invention is not intended to be limited to the structure of the measuring instrument in the aforementioned embodiment, in which the sectional C-shaped sliders 51A and 51B are respectively attached on the guiding faces 44 and 45 formed on the side faces of the prism-shaped rail 43. A measuring instrument may have the sliders 51A and 51B which are movably attached on another area of the rail 43, constituting the portal frame 41 as shown in FIG. 17.

In the aforementioned embodiment, the separation of the probes 91A and 91B from the object W is performed by the elevating mechanism 11 lifting up and down the table 35. This structure is not limited. A measuring instrument may have an elevating mechanism in which the pillars 42A and 42B of the portal frame 41 are lifted up and down. In the measuring instrument in which the pillars 42A and 42B are lifted up and down, longer distance between the table 35 and the probes 91A and 91B in the vertical direction can be obtained, so that a larger object can be measured. Additionally, the elevating mechanism is not needed to be provided on the table 35, so that the structure of the table is further simplified.

The number of the rail 43 of the portal frame 41 is one in the aforementioned embodiment, but this number is not limited. A portal frame may have a pair of rails respectively attached with sliders, thereby obtaining the same effects as that in the aforementioned embodiment.

Figure 18:
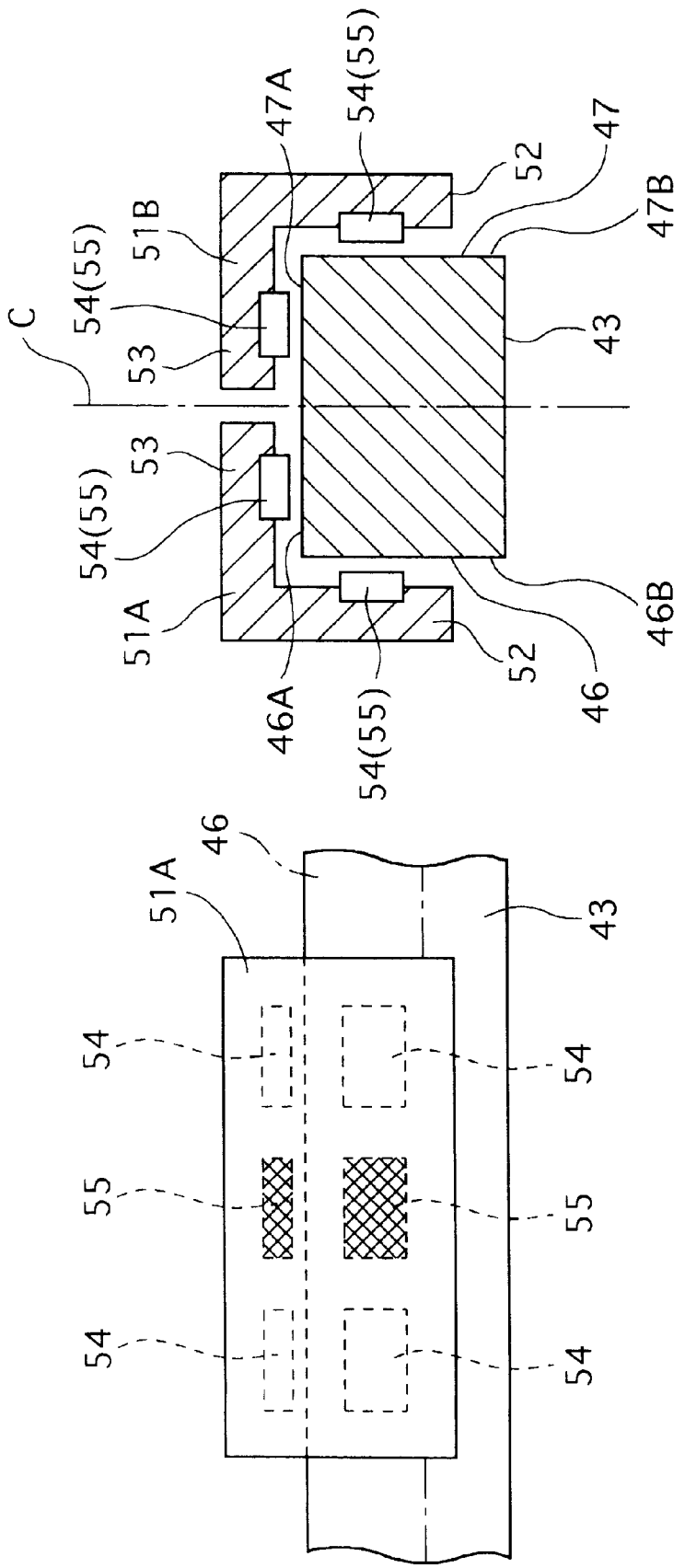
FIGS. 18A and 18B are drawings of still another preferred embodiment of a movement guiding mechanism of a slider relative to a rail.

Concerning the moving mechanism of the sliders 51A and 51B, as shown in FIG. 18B, top faces 46A and 47A and side faces 46B and 47B of the rail 43 may be respectively defined as guiding faces 46 and 47, and a moving mechanism can have sectional L-shaped sliders in which the sliders 51A and 51B are respectively provided with the vertical portions 52 confronting the side faces 46B and 47B and the horizontal portions 53 confronting the top faces 46A and 47A.

Figure 19:
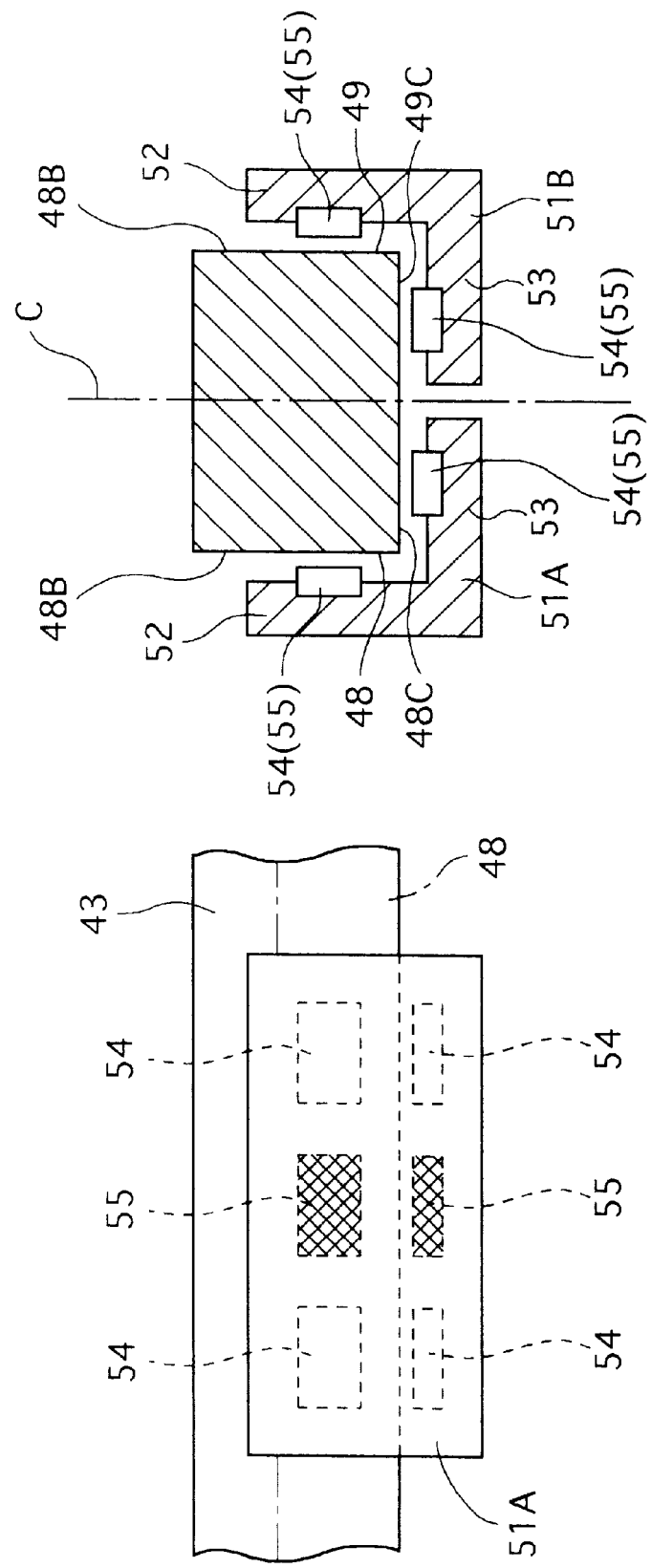
FIGS. 19A and 19B are drawings of yet another preferred embodiment of a movement guiding mechanism of a slider relative to a rail.
Figure 20:
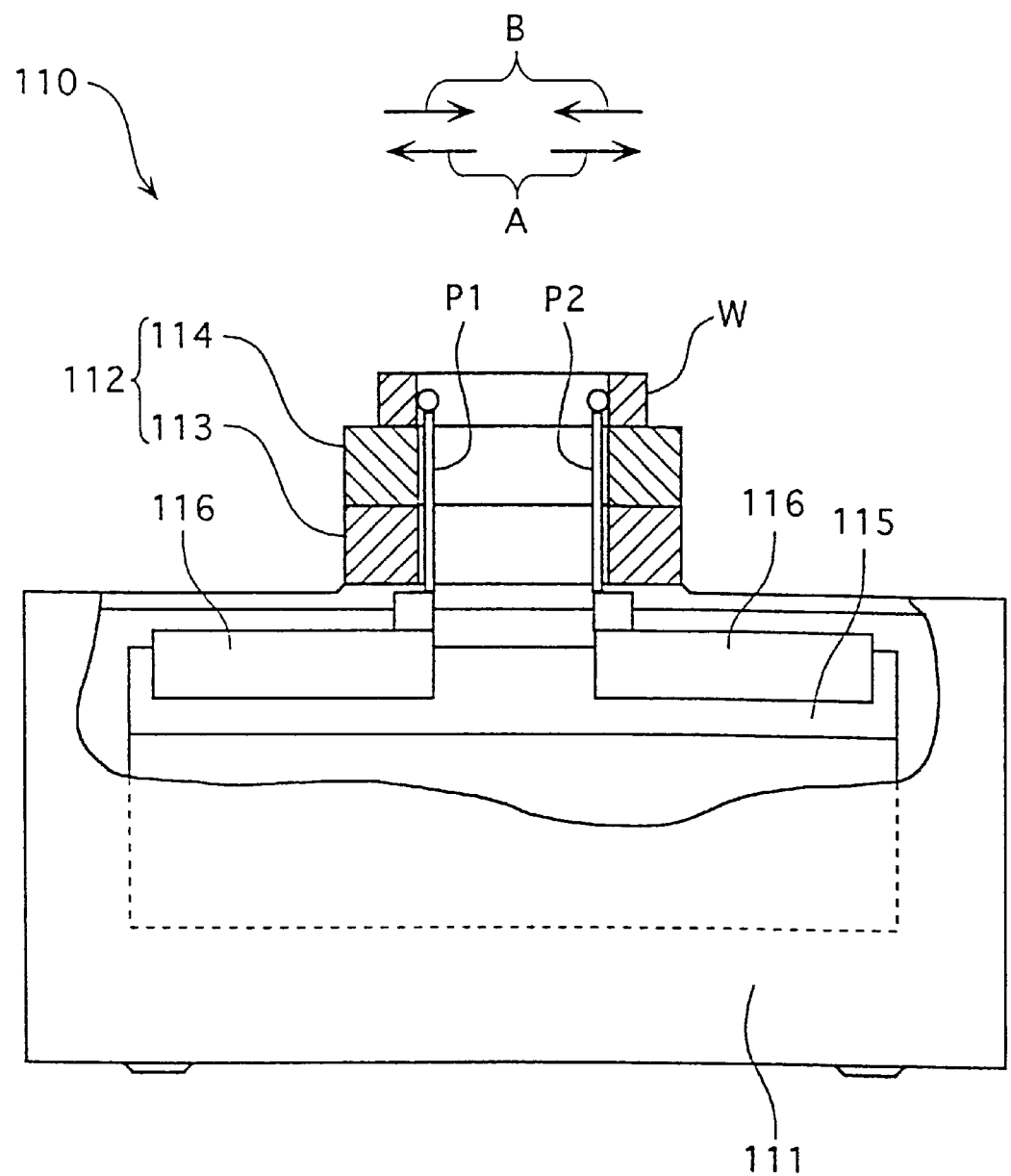
FIG. 20 is a drawing of a conventional inner and outer dimension measuring instrument.

Alternatively, as shown in FIG. 19B, bottom faces 48C and 49C and side faces 48B and 49B of the rail 43 may be respectively defined as guiding faces 48 and 49, and a moving mechanism can have sectional L-shaped sliders including the vertical portion 52 and the horizontal portion 53 respectively confronting the guiding faces 48 and 49.

In this case, it is desirable that the magnet 55 as the attracting means is provided on the horizontal portion 53 as well as the vertical portion 52 so that force in the vertical direction is balanced. That is, the air bearing 54 and the magnet 55 can be appropriately positioned in response to configuration of the rail and slider so that the rail and the slider are abutted to each other.

It is not limited that the attracting means be a magnet producing the attractive force toward the steel rail 43 as in the aforementioned embodiment. When a negative-pressure applying device for inhaling air between the slider and the rail is used as the attracting means, the same effects as described earlier can be also obtained.

The rail 43 has a pillar shape of a quadrangular cross-section in the aforementioned embodiment. The shape of the rail is not limited to the above shape. For example, the rail can have a pillar shape of a circular cross-section or a tubular shape of a quadrangular or circular cross-section. In other words, even when various configurations and structures are used, the same effects as described earlier can be obtained insofar as the sectional configuration is able to be divided to form the first guiding face and the second guiding face.

The material of the rail 43 is not limited to use a steel pillar. A stone pillar can be used for the rail. In this case, an iron plate may be adhered on the side of the stone pillar in correspondence with a moving range of the magnet of the slider. When the stone pillar is used for the rail, a change in size with a change in temperature is smaller, so that the operation of the moving mechanism of the probe is stable.

In the aforementioned embodiment, the air bearing 54 provided on each vertical portion 52 and each horizontal portion 53 of the sliders 51A and 51B is secured to the vertical portion 52 and the horizontal portion 53, but it is not limited. The air bearing may be provided to be position-adjustable in a direction intersecting each surface of the vertical portion 52 and the horizontal portion 53, namely, adjustable with respect to a distance to the rail 43.

In this case, the air bearing provided on any one of the upper and lower horizontal portions 53 may be position-adjustable. When the air bearing is able to be position-adjustable, the air bearing can be placed at an appropriate position with respect to the rail irrespective of the dimensional preciseness of the slider and the rail. Thus, since the dimensional preciseness of the slider and the rail is not needed to be so high, the production costs for the moving mechanism of the probe can be reduced.

Each sectional shape of the shafts 92A and 92B is not limited to be approximately circular as in the aforementioned embodiment. A shaft of an approximately rectangular cross-section having a length L and a height H (L>H) may be used.

Each of the contact portions 93A and 93B is not limited to have an approximately hemispherical shape as in the aforementioned embodiment. For example, a contact portion may be shaped to be a projection provided on each outer circumferential face of the linking portions 94A and 94B.

The inner diameter measuring instrument for measuring the inner diameter of the object W has been explained in the aforementioned embodiments. The present invention, however, is not intended to be limited to the inner diameter measurement, and is applied to an outer diameter measuring instrument for measuring an outer diameter of the object W, and an inner and outer dimension measuring instrument for measuring the inner and outer dimension, such as a width or thickness of a groove, of the object W. Incidentally, in applying to a measuring instrument for the outer diameter or the outer dimension, the pair of the probes is urged at a predetermined pressure in a direction that the probes approach each other.

Effects of the present invention

According to a measuring instrument of the present invention, a probe is extended downward from a slider without passing through a table, and the flexural deformation of the probe is smaller by minimizing the length of the probe, thereby achieving the measurement with high accuracy and omitting a relative measurement with a standard sample.

According to a measuring instrument of the present invention, adjustment to align a measurement axis with a diametral position of an object, and adjustment to correct a tilt of an axis of an inner or outer diameter of the object with respect to an axis line perpendicular to the measurement axis are performed simply and properly.

According to a probe of the present invention, shafts of the pair of probes are located on both sides of a moving axis when the pair of the probes is moved to approach each other, so that the sectional shape of the assembled shafts is smaller as a whole, thereby measuring with high preciseness and achieving the reliable measurement for an inner dimension irrespective of the distance between the inner sides of an object to be measured.

What is claimed is:

1. A pair of probes for a measuring instrument capable of measuring the inner dimension of an object by the distance between said pair of probes said probes being movable back and forth along a movement direction and being movable in an opposite direction of each other to be abutted to the inner surfaces of the object, said probes comprising:

stick-shaped shafts connected to moving members for moving the probes at the base end thereof, a contact portion provided at the other end of said shafts for being abutted to the inner surfaces of the object, and the cross section of said shafts having larger longitudinal dimensions along the movement direction of said probes than the width dimension along the direction perpendicular to the movement direction, and the shafts of said probes being located on both sides of the movement direction and overlapping when said pair of probes are moved close to each other.

2. The pair of probes for the measuring instrument according to claim 1, wherein the cross section of each said shaft has an approximately semicircular shape, and is formed to be approximately circular once being overlapped with the other cross section of said shaft of said pair of probes by the movement of said pair of probes to approach each other.

3. The pair of probes for the measuring instrument according to claim 1, further comprising:

linking portions associated with each shaft having a cross section rotated in 90 degrees around the axis of said shaft, the cross section having a larger width dimension along the movement direction of said probes than the width dimension perpendicular to the movement direction of said probes, and said shafts and said contact portions being connected through said linking portions.

4. The pair of probes for the measuring instrument according to claim 2, further comprising:

linking portions associated with each shaft having a cross section rotated in 90 degrees around the axis of said shaft, the cross section having a larger longitudinal dimension along the movement direction of said probes than the width dimension perpendicular to the movement direction of said probes, and said shafts and said contact portions being connected through said linking portions.

5. The pair of probes for the measuring instrument according to claim 1, where in said contact portions have an approximately hemispherical shape.

6. The pair of probes for the measuring instrument according to claim 4, wherein said contact portions have an approximately hemispherical shape.

* * * * *